US006799086B2

(12) United States Patent
Toki

(10) Patent No.: US 6,799,086 B2
(45) Date of Patent: Sep. 28, 2004

(54) ROBOT, ROBOT CONTROL SYSTEM, AND PROGRAM FOR THE SAME

(75) Inventor: Yasuyuki Toki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/059,018

(22) Filed: Jan. 30, 2002

(65) Prior Publication Data

US 2002/0123826 A1 Sep. 5, 2002

(30) Foreign Application Priority Data

Jan. 30, 2001 (JP) .......................................... 2001-022320
Jan. 25, 2002 (JP) .......................................... 2002-017725

(51) Int. Cl.⁷ .............................................. G06F 19/00
(52) U.S. Cl. ...................... 700/245; 700/252; 700/255; 700/257; 700/247; 700/249; 700/251; 700/259; 700/264; 700/167; 700/174; 318/568.1; 318/568.13; 318/568.16; 318/568.21; 901/23; 901/33; 901/42; 901/46; 901/47; 701/23; 701/28; 701/50; 701/300
(58) Field of Search .............................. 701/23, 50, 24, 701/300, 28, 2; 70/28; 901/23, 32, 42, 46, 47, 6, 8, 9; 219/124.34; 414/729, 1, 744; 700/245, 251, 252, 247, 249, 255, 264, 167, 174, 95, 257, 108, 259; 318/568.1, 568.13, 568.14, 568.21, 568.16; 706/10, 906; 348/120

(56) References Cited

U.S. PATENT DOCUMENTS

| | | | | | |
|---|---|---|---|---|---|
| 4,616,121 A | * | 10/1986 | Clocksin et al. | ........ | 219/124.34 |
| 4,663,726 A | * | 5/1987 | Chand et al. | ................ | 700/252 |
| 4,835,730 A | * | 5/1989 | Shimano et al. | ............ | 700/257 |
| 4,855,923 A | * | 8/1989 | Fullmer | ...................... | 700/108 |
| 5,555,179 A | * | 9/1996 | Koyama et al. | .............. | 700/95 |
| 5,798,627 A | * | 8/1998 | Gilliland et al. | ....... | 318/568.14 |
| 6,114,824 A | * | 9/2000 | Watanabe | ............... | 318/568.12 |
| 6,282,460 B2 | * | 8/2001 | Gilliland et al. | ............ | 700/255 |
| 6,289,264 B1 | * | 9/2001 | Zenke | ........................ | 700/245 |
| 6,345,213 B1 | * | 2/2002 | Graeser et al. | ............. | 700/245 |

FOREIGN PATENT DOCUMENTS

| | | |
|---|---|---|
| JP | 11-327872 | 11/1999 |
| JP | 2000-75907 | 3/2000 |
| JP | 2000-326274 | 11/2000 |

OTHER PUBLICATIONS

Nourbakhsh, Property mapping: a simple technique for5 mobile robot programming, 2000, Internet, pp. 1–6.*
Lee et al., learning Robot Behaviors by Evolving Genetic Programs, 2000, Internet/IEEE, pp. 2867–2872.*
Hong et al., Compiling real–time programs into schedulable code, 1993, Internet, pp. 166–176.*
Toth, New PC and labview based robot control system, 1999, Internet, pp. 179–188.*
Gini et al., Dealing with world–model–based programs, Internet, pp. 1985.*
Baldassari et al., An environment for operational software engineering in ada, 1989, Internet, pp. 126–146.*

* cited by examiner

Primary Examiner—Thomas G. Black
Assistant Examiner—McDieunel Marc
(74) Attorney, Agent, or Firm—Foley & Lardner LLP

(57) ABSTRACT

A robot control system includes a scenario receiver to receive a robot control program or scenario, a scenario register to incorporate the received scenario in the robot, a scenario selector to select a scenario for execution thereof from scenarios beforehand incorporated in the robot and scenarios added to the robot, and a scenario executor to execute the selected scenario. Therefore, there are provided a robot, a robot control system, and a program of the same in which a new control program module can be added to a robot control program.

42 Claims, 25 Drawing Sheets

F I G. 3
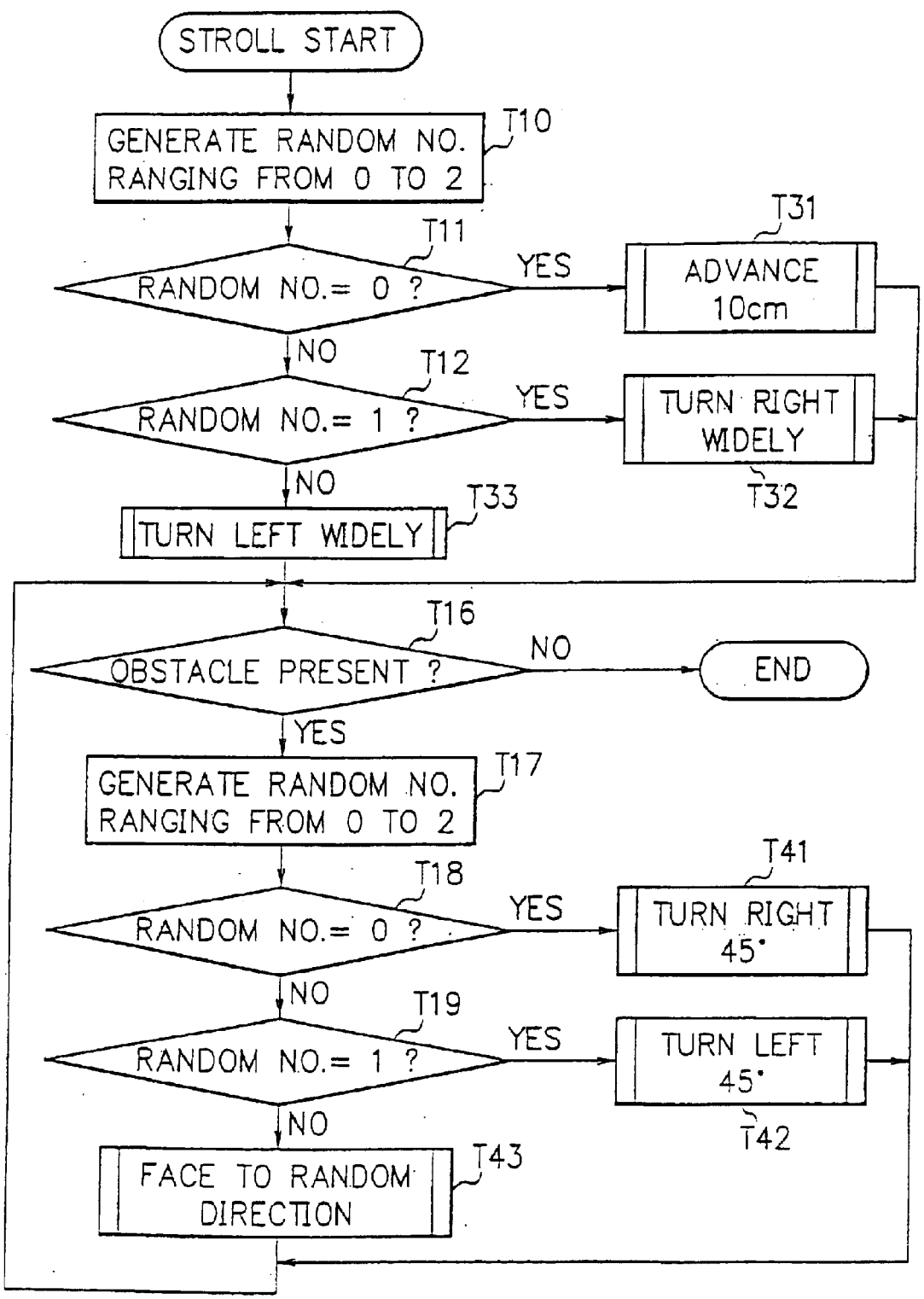

FIG. 6
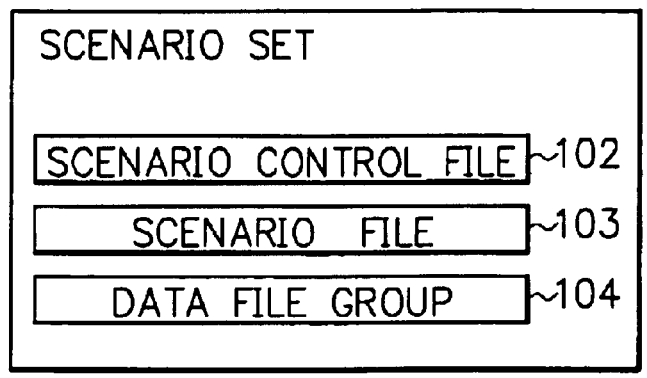
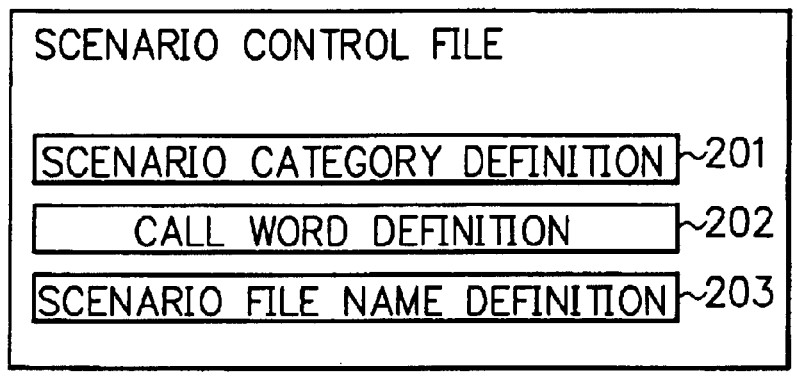
FIG. 7
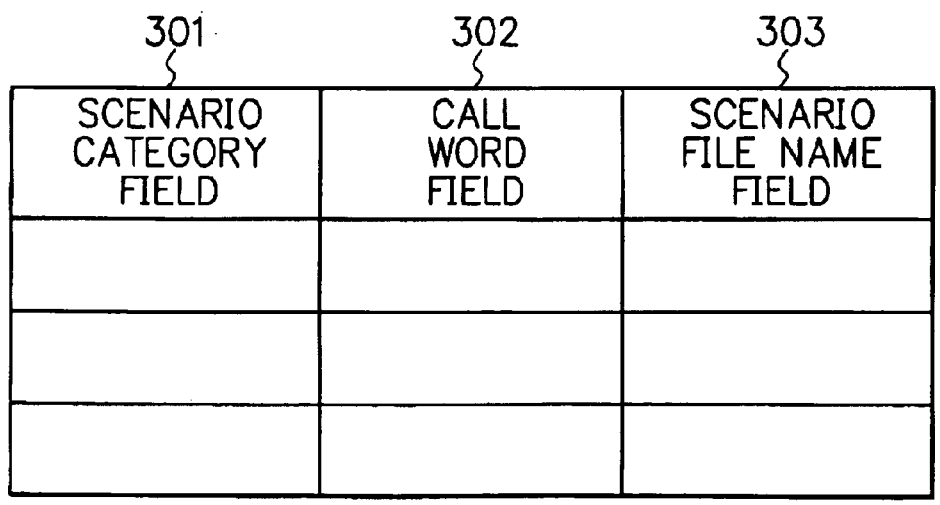

FIG. 16
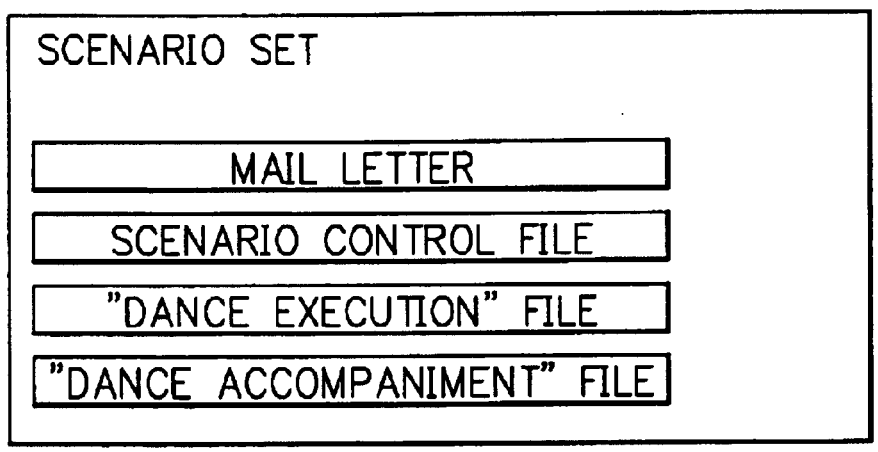
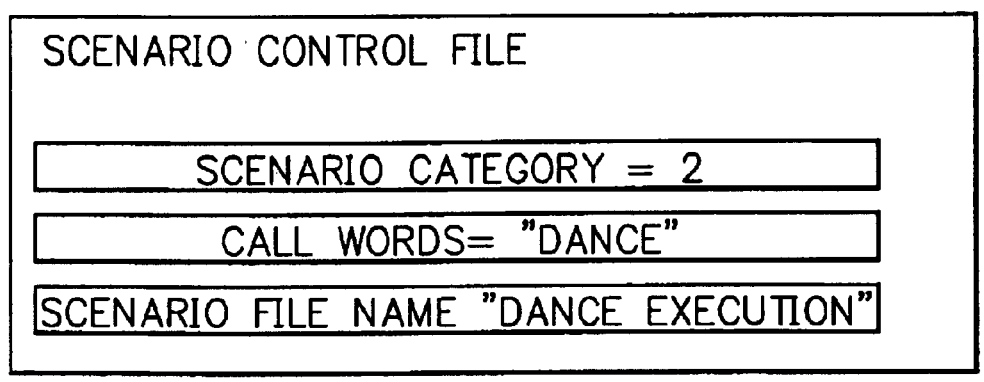

FIG. 17

VOICE RECOGNIZER DICTIONARY

| GOOD MORNING | TURN TV ON | WHAT TIME IS IT NOW ? |

| DANCE |

SYSTEM STORAGE SCENARIO

| DANCE EXECUTION | DANCE ACCOMPANIMENT |

SCENARIO CONTROL TABLE

| SCENARIO CATEGORY FIELD | CALL WORD FIELD | SCENARIO NAME FIELD |
|---|---|---|
| 0 | NULL | ADVANCE STRAIGHT |
| 0 | NULL | MEANDER AND ADVANCE |
| 1 | NULL | TURN RIGHT |
| 1 | NULL | TURN LEFT |
| 2 | GOOD MORNING | GREETING |
| 2 | TURN TV ON | CONTROL TV |
| 2 | WHAT TIME IS IT NOW ? | CLOCK |
| 2 | DANCE | DANCE EXECUTION |

FIG. 18
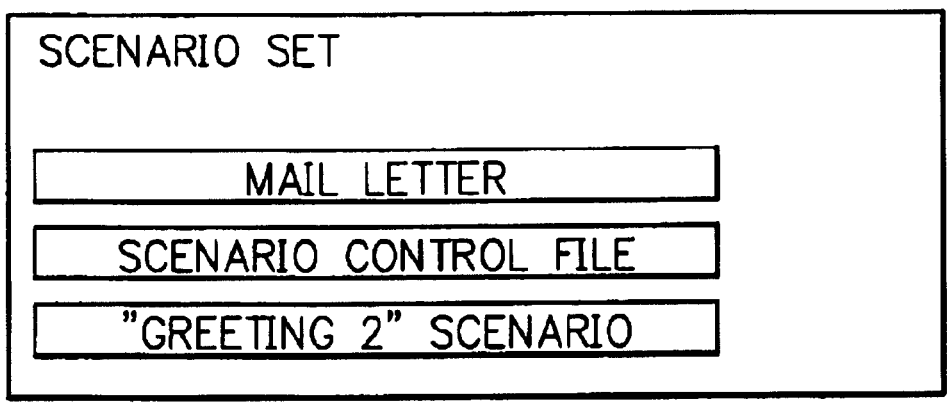
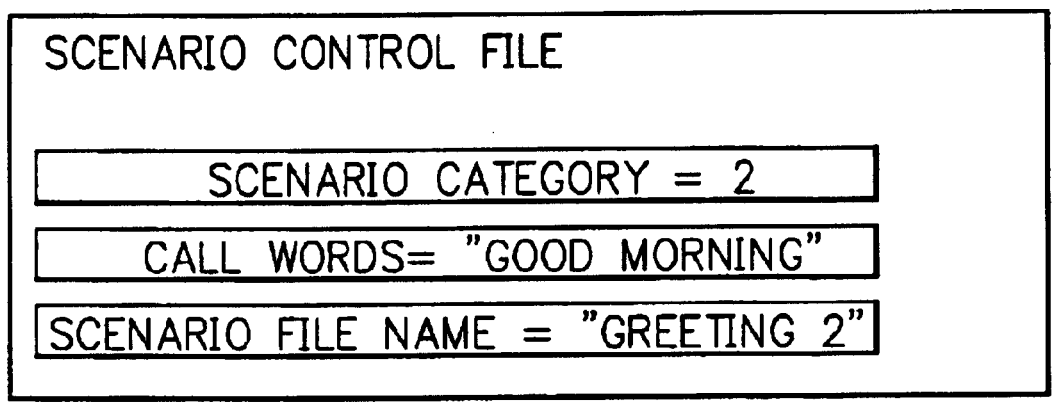

FIG. 19

| VOICE RECOGNIZER DICTIONARY |
|---|
| GOOD MORNING     TURN TV ON     WHAT TIME IS IT NOW ? <br> DANCE |

| SYSTEM STORAGE SCENARIO |
|---|
| DANCE EXECUTION     DANCE ACCOMPANIMENT     GREETING 2 |

SCENARIO CONTROL TABLE

| SCENARIO CATEGORY FIELD | CALL WORD FIELD | SCENARIO NAME FIELD |
|---|---|---|
| 0 | NULL | ADVANCE STRAIGHT |
| 0 | NULL | MEANDER AND ADVANCE |
| 1 | NULL | TURN RIGHT |
| 1 | NULL | TURN LEFT |
| 2 | GOOD MORNING | GREETING |
| 2 | TURN TV ON | CONTROL TV |
| 2 | WHAT TIME IS IT NOW ? | CLOCK |
| 2 | DANCE | DANCE EXECUTION |
| 2 | GOOD MORNING | GREETING 2 |

FIG. 25
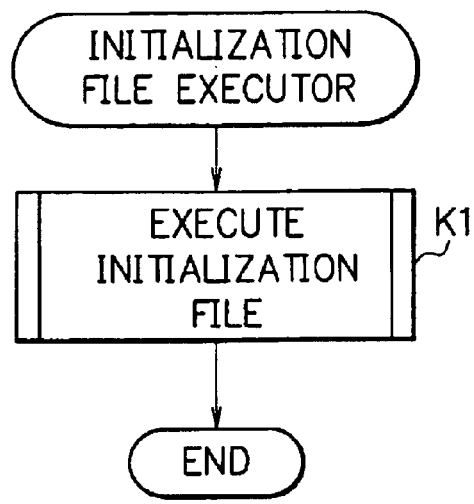
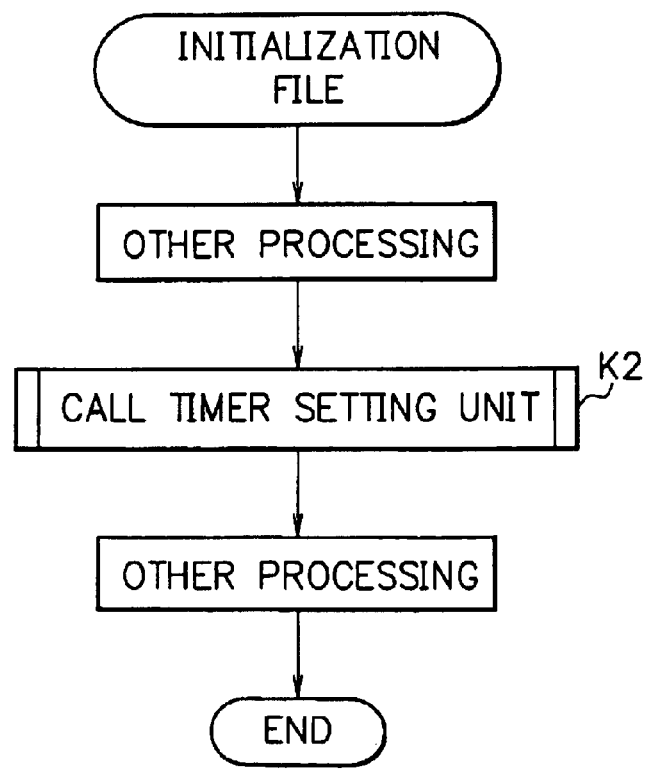

ROBOT, ROBOT CONTROL SYSTEM, AND PROGRAM FOR THE SAME

BACKGROUND OF THE INVENTION

The present invention relates to a robot, a robot control system, and a program for the same, and in particular, to a robot, a robot control system, and a program for the same in which a new control program module is received via a network connected to a robot such that the program is added to and is executed in the robot.

Description of the Prior Art

In the prior art, a robot of this kind includes such constituent components as an image input unit, a human searching sensor, a voice input unit, a voice recognizer unit, a voice output unit, a leg motor, a head motor, and an action control unit. Actions of the robot are controlled by a control program installed in the action controller.

FIG. 1 shows an example of constitution of such a robot. As can be seen from FIG. 1, the robot includes a voice input unit 900 such as a microphone, a voice recognizer unit 901 which recognizes words according to voice or sound inputted from the voice input unit 900 to convert the words into a string of characters representing a reading of the words, a voice output unit 902 to sound a voice file from a speaker or the like, an ultrasonic sensor 903 to measure distance to an obstacle, a leg motor 904 to move a main body of the robot, a head motor 905 to turn a head of the robot, and a data processing unit 906 to process data under control of a program.

FIG. 2 shows a flowchart of a control program of the robot.

First, whether or not any voice has been received from the voice input unit 900 (step S10). If such a voice input is absent (no in step S10), the program calls "stroll" (step S11). If the input is present (yes in step S10), program calls "dialog" (step S12).

FIG. 3 shows processing of "stroll" in a flowchart. The program a plurality of kinds of moving program modules and obstacle avoiding program modules. The program has various moving patterns. That is, the program generates random numbers to select program modules to be executed.

The program first generates a random number ranging from 0 to 2 (step T10) to select one module from three basic moving program modules (steps T11, T12, T31, T32, and T33) according to the random number. In this specification, such a basic action program module of the robot is referred to as "scenario". That is, one scenario is selected from three moving or action scenarios of the robot according to the random number. The action scenario are "move 10 centimeters (cm) forward", "turn right widely", and "turn left widely".

Next, a signal from the ultrasonics sensor 903 is examined to determine whether or not an obstacle exists in front of the robot (step T16). If no obstacle exists (no in step T16), the processing is terminated. If any obstacle exists (yes in step T16), the program generates a random number ranging from 0 to 2 to select one scenario from three obstacle avoiding scenarios (steps T17, T18, T19, T41, and T42). The obstacle avoiding scenarios are "turn right 45°", "turn left 45°", and "face to random direction".

FIG. 4 shows processing of "dialog" in a flowchart. The program includes a response program according to recognized words to conduct a dialog with a user in response to a call from the user.

The program first receives the reading of recognized words from the voice recognizer 901 (step U10). The program then calls a dialog scenario according to each recognition word (steps U11 to U16). If there does not exist any corresponding dialog scenario, the program calls a wrong recognition response scenario (step U17).

Each scenario is a program executable in the data processor 906. The program is described in the C language to be directly executed by the data processor 906 or is described in a high level language which is interpreted and is or may be executed by an interpreter of the data processor 906.

Japanese Patent Application Laid-Open No. 2000-326274 describes an example of a robot of the prior art.

The robot described in the publication includes a moving control processing section, a human search processing section, a control switching section, and an input information storing section. For example, when the dialog processing section receives input information containing an output from a voice recognizer, the dialog processing section outputs a voice according to recognized words from a voice output unit. The dialog processing section refers to friendliness of a human being recognized and produces a response, i.e., a voice according to the friendliness.

Japanese Patent Application Laid-Open No. Hei 11-327872 describes a technology for use with a robot of animal type connected to a network. In the technique, by analyzing an electronic-mail or e-mail letter received from the network, the program reads out the contents of the analyzed e-mail letter and produces an effect sound according to a string of particular symbols contained in the e-mail letter, thereby controls all or part of operation of the robot.

Japanese Patent Application Laid-Open No. 2000-75907 describes a technique regarding an industrial robot to receive an operation indication by e-mail. In the technique, a product agent has a mail unit and an execution unit. The execution unit executes processing of an operation according to an e-mail letter received by the mail unit.

However, the techniques of the prior art are attended with a problem that it is impossible to receive a new function via the network to add the function to an existing robot control program for the following reason.

In the robot control program of the prior art, the operation to receive a new function to add the function thereto has not been taken into consideration.

In the prior art described in Japanese Patent Application Laid-Open No. Hei 11-327872, any operation to be conducted as a result of the analysis of an e-mail letter received from the network has been beforehand incorporated in the robot. This leads to a problem that a new operation cannot be added thereto.

Japanese Patent Application Laid-Open Ser. No. 2000-75907 describes a technique of the prior art in which the acceptable e-mail letter is an indication of operation for an executing block incorporated in the product agent in advance. This brings about a problem that a new executing block cannot be added to the agent by electronic mail.

SUMMARY OF THE INVENTION

It is therefore an object of the present invention, which has been devised to remove the problems, to provide a robot, a robot control system, and a program for the same in which a new function of a control program of a robot can be received via a network so that the new function is added to the robot control program and is executed in the robot.

To achieve the object in accordance with a first aspect of the present invention, there is provided a robot for executing a robot control program module, the robot receiving a new robot control program module from a communication line and writing the new robot control program module in a recording section of the robot.

In accordance with a second aspect of the present invention, there is provided a robot, comprising receiver means for receiving a new robot control program module from a communication line, register means for adding the control program module received by the receiver means to the robot, selector means for selecting a robot control program module to be executed from a robot control program module originally included in the robot and the robot control program module added to the robot, and control program executor means for executing the robot control program module selected by the selector means.

In accordance with a third aspect of the present invention, there is provided a robot, wherein the receiver means uses an internet as the communication line and receives the control program module by electronic mail.

In accordance with a fourth aspect of the present invention, there is provided a robot further comprising initialization program executor means for executing an initialization program included in the control program module registered by the register means, at the registration of the control program module, the initialization program determining an execution point of time of the control program module.

In accordance with a fifth aspect of the present invention, there is provided a robot further comprising voice recognition word adder means for adding voice recognition words to a voice recognizer dictionary, the voice recognition words being used to call the control program module registered by the register means.

In accordance with a sixth aspect of the present invention, there is provided a robot further comprising received program executor means for executing the control program module received by the receiver means, at the reception thereof.

In accordance with a seventh aspect of the present invention, there is provided a robot, wherein the received program executor means erases, after having executed the control program module, the control program module.

In accordance with an eighth aspect of the present invention, there is provided a robot control system for use with a robot for executing a robot control program module, the robot control system receiving a new robot control program module from a communication line and writing the new robot control program module in a recording section of the robot.

In accordance with a ninth aspect of the present invention, there is provided a robot control system, comprising receiver means for receiving a new robot control program module from a communication line, register means for adding the control program module received by the receiver means to the robot control system, selector means for selecting a robot control program module to be executed from a robot control program module originally included in the robot and the robot control program module added to the robot, and control program executor means for executing the robot control program module selected by the selector means.

In accordance with a tenth aspect of the present invention, there is provided a robot control system, wherein the receiver means uses an internet as the communication line and receives the control program module by electronic mail.

In accordance with an 11th aspect of the present invention, there is provided a robot control system further comprising initialization program executor means for executing an initialization program included in the control program module registered by the register means, at the registration of the control program module, the initialization program determining an execution point of time of the control program module.

In accordance with a 12th aspect of the present invention, there is provided a robot control system further comprising voice recognition word adder means for adding voice recognition words to a voice recognizer dictionary, the voice recognition words being used to call the control program module registered by the register means.

In accordance with a 13th aspect of the present invention, there is provided a robot control system further comprising received program executor means for executing the control program module received by the receiver means, at the reception thereof.

In accordance with a 14th aspect of the present invention, there is provided a robot control system, wherein the received program executor means erases, after having executed the control program module, the control program module.

In accordance with a 15th aspect of the present invention, there is provided a program for making a computer execute a robot control program module for a robot, the program receiving a new robot control program module from a communication line and writing the new robot control program module in a recording section of the robot.

In accordance with a 16th aspect of the present invention, there is provided a program for use with a robot, comprising the steps of receiving a new robot control program module from a communication line, additionally registering the control program module received by the receiver means to the robot control system, selecting a robot control program module to be executed from a robot control program module originally included in the robot and the robot control program module added to the robot, and executing the robot control program module selected by the selector means.

In accordance with a 17th aspect of the present invention, there is provided a program, wherein the receiving step uses an internet as the communication line and receives the control program module by electronic mail.

In accordance with an 18th aspect of the present invention, there is provided a program further comprising the step of making a computer execute an initialization program execution step, the initialization program execution step executing an initialization program included in the control program module registered by the registering step, at the registration of the control program module, the initialization program determining an execution point of time of the control program module.

In accordance with a 19th aspect of the present invention, there is provided a program further comprising the step of making a computer execute a voice recognition word adder step, the voice recognition word adder step adding voice recognition words to a voice recognizer dictionary, the voice recognition words being used to call the control program module registered by the registering step.

In accordance with a 20th aspect of the present invention, there is provided a program further comprising the step of making a computer execute a received program executing step of executing the control program module received by the receiver means, at the reception thereof in the receiving step.

In accordance with a 21st aspect of the present invention, there is provided a program, wherein the received program executing step includes erasing, after having executed the control program module, the control program module.

BRIEF DESCRIPTION OF THE DRAWINGS

The objects and features of the present invention will become more apparent from the consideration of the following detailed description taken in conjunction with the accompanying drawings in which:

FIG. 3 is a flowchart further showing operation of a prior art example; and

FIG. 6 is a diagram showing a scenario set and a scenario control file of the first embodiment in accordance with the present invention;

FIG. 7 is a diagram showing a scenario control table of the first embodiment in accordance with the present invention;

FIG. 16 is a diagram showing the contents of a scenario set and a scenario control file in the first embodiment in accordance with the present invention;

FIG. 17 is a diagram showing the contents of a voice recognizer dictionary, a scenario control table, and an extended scenario storage block after registration of a scenario in the first embodiment in accordance with the present invention;

FIG. 18 is a diagram showing the contents of a scenario set and scenario control table in the first embodiment in accordance with the present invention;

FIG. 19 is a schematic diagram showing a voice recognizer dictionary, a scenario control table, and an extended scenario storage block after registration of a scenario in the first embodiment in accordance with the present invention;

FIG. 25 is a flowchart showing operation of an initialization file execution block in the second embodiment in accordance with the present invention;

DESCRIPTION OF THE EMBODIMENTS

Referring next to the accompanying drawings, description will be given in detail of an embodiment in accordance with the present invention.

First embodiment

Figure 1:
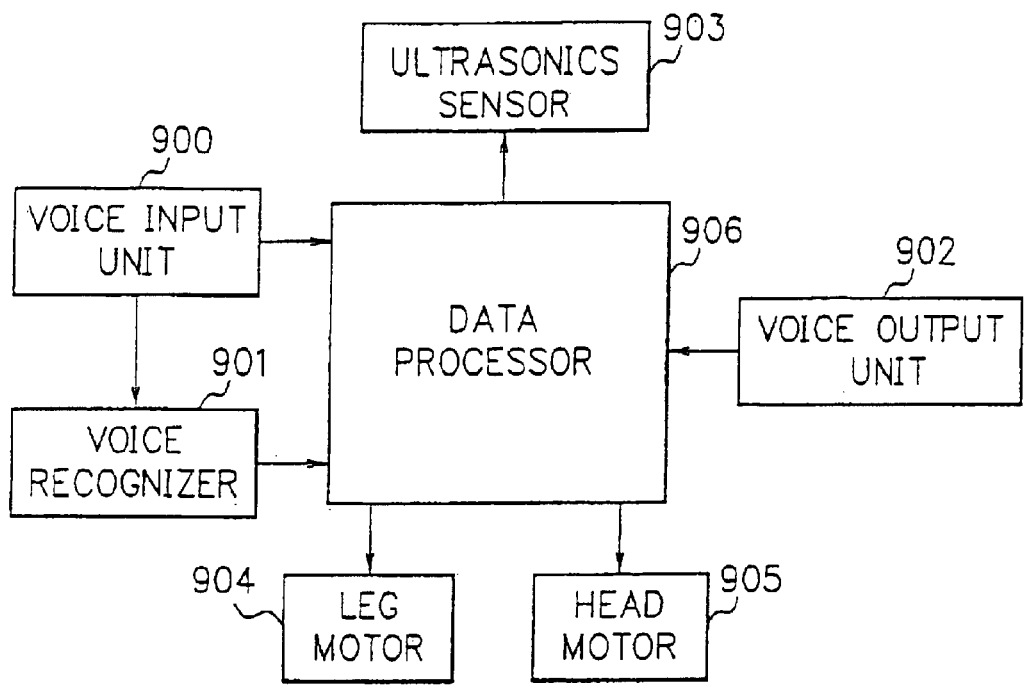
FIG. 1 is a block diagram showing constitution of a prior art example.
Figure 2:
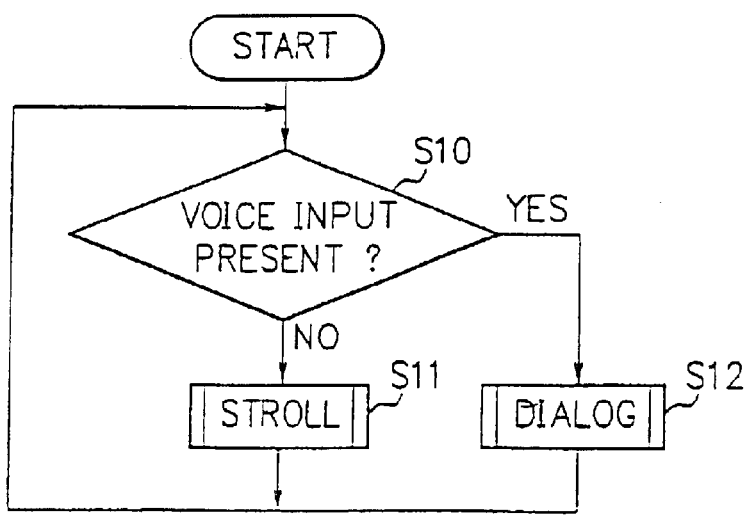
FIG. 2 is a flowchart showing operation of a prior art example.
Figure 4:
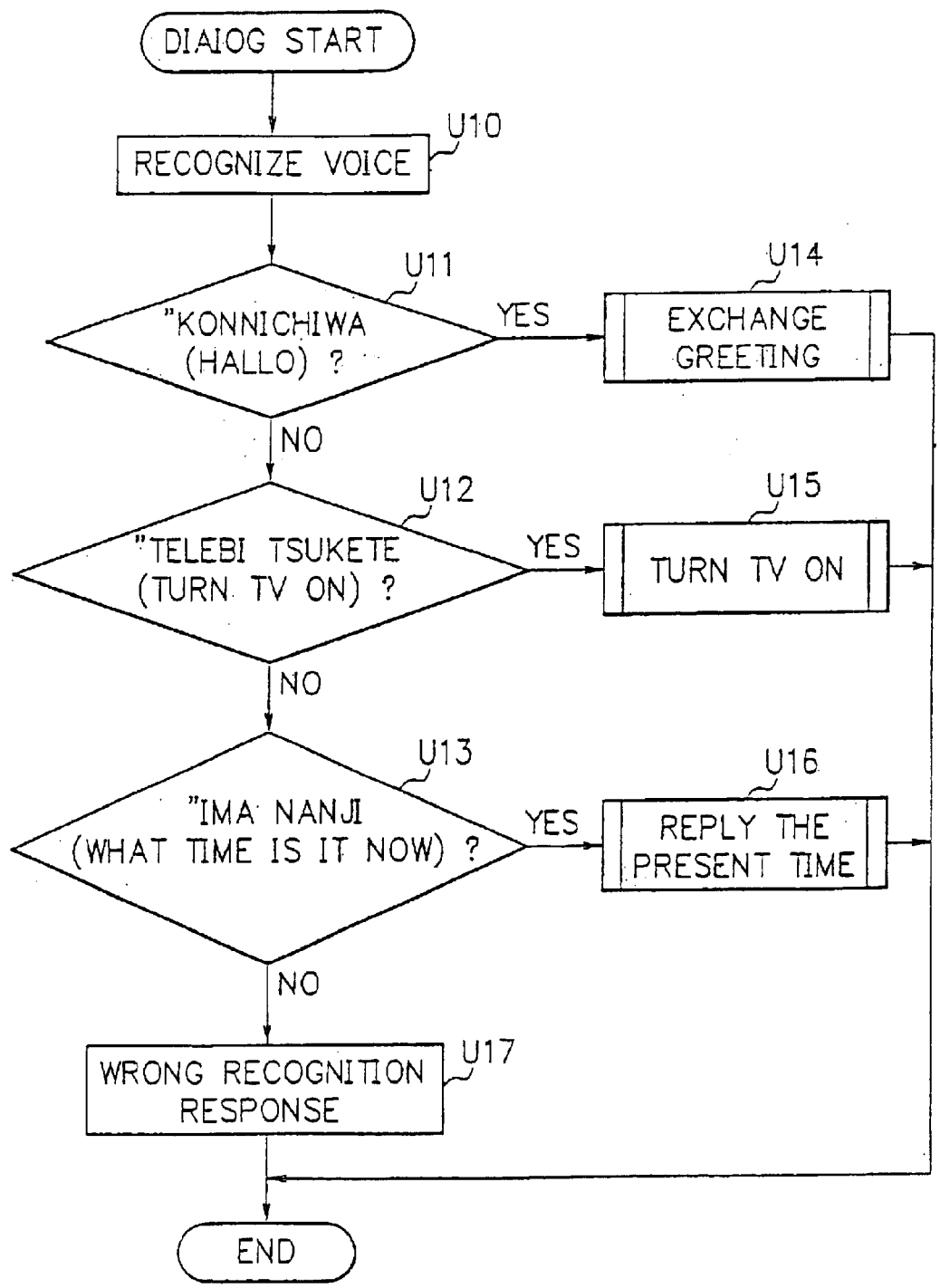
FIG. 4 is a flowchart further showing operation of a prior art example.
Figure 5:
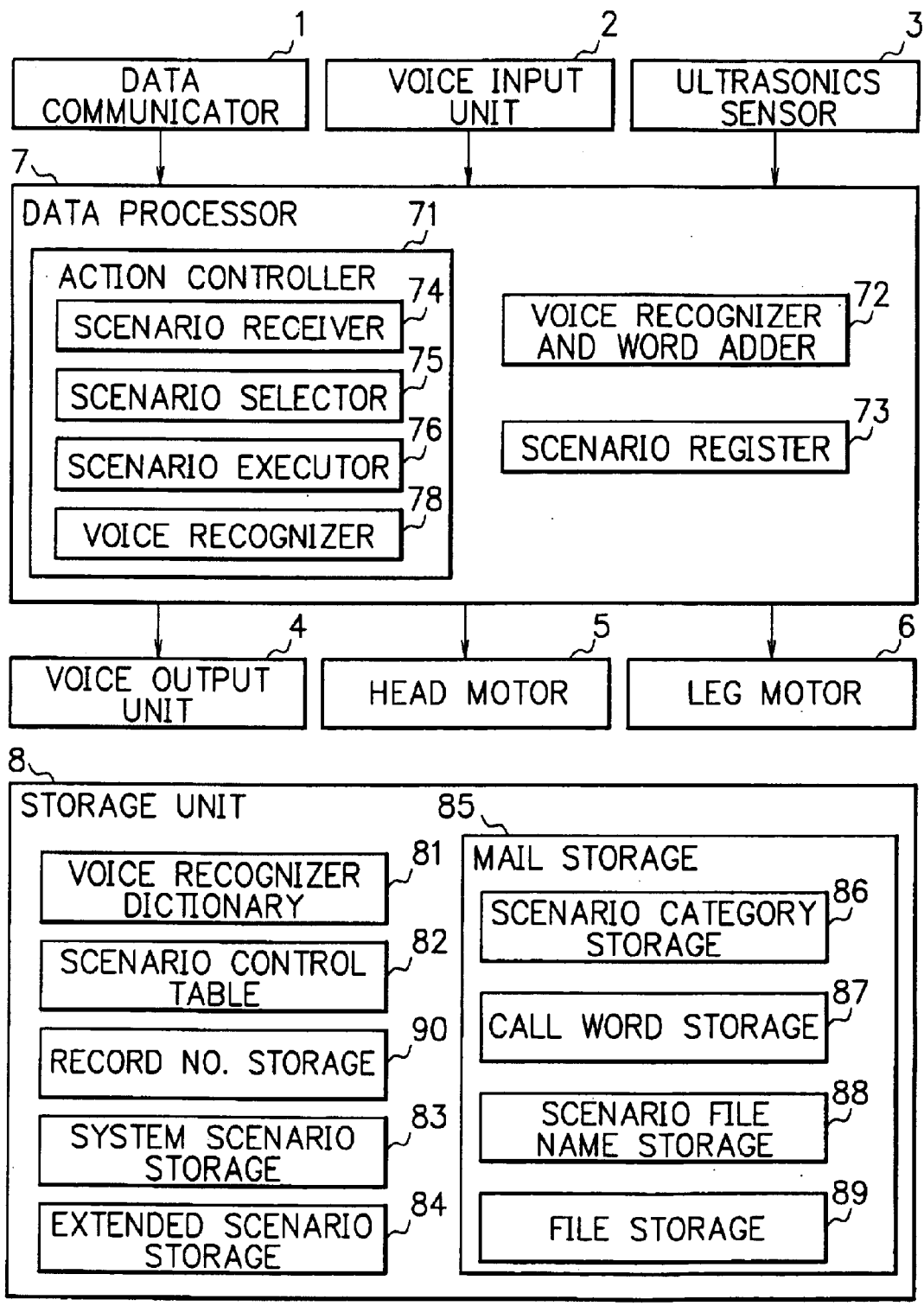
FIG. 5 is a schematic block diagram showing a configuration of a first embodiment in accordance with the present invention.

Referring to FIG. 5, the configuration of the first embodiment of the present invention includes a data communicator unit 1 such as a modem, a voice input unit 2 such as a microphone, an ultrasonics sensor 3 to sense an obstacle in front thereof, a voice output unit 4 such as a speaker, a head motor(s) 5 to turn a head of a robot, a leg motor(s) 6 to move a body or a trunk of the robot, a data processor unit 7 to conduct operation under control of a program, and a storage unit 8 such as a disk device.

The data processor 7 includes an action controller block 71, a voice recognition word adder block 72, and a scenario register block 73. The action controller 71 includes a scenario receiver block 74, a scenario selector 75, a scenario executor block 76, and a voice recognizer block 78.

The storage unit 8 includes a voice recognizer dictionary(s) 81, a scenario control table(s) 82, a system scenario storage block 83, an extended scenario storage block(s) 84, a mail storage block 85, and a record number storage block 90. The mail storage block 85 includes a scenario category storage block 86, a call word storage block 87 a scenario file name storage block 88 and a file storage block 89.

Referring now to FIG. 6, information, which will be referred to as a scenario set hereinbelow, received by the scenario receiver block 74 to register a scenario to the robot includes a scenario control file 102 and a scenario file(s) (execution file(s)) 103. The information received by the scenario receiver block 74 may include a data file(s) 104 depending on cases.

The scenario file 103 is a main body of a scenario program described in a binary format which can be directly executed by the data processor 7 or in a format of an intermediate language which is executed by an interpreter.

The data file group 104 includes data files, for example, a voice file to be used by the scenario file 103.

The scenario control file 102 includes a scenario category definition field 201, a call word definition field 202, and a scenario file name definition field 203.

The scenario category definition field 201 contains a value indicating a kind or category of the associated scenario. In this example of the embodiment, "0", "1", and "2" are respectively described in the fields for the categories of the stroll scenario, the obstacle avoidance scenario, and the dialog scenario, respectively.

In the call word definition field 202, words (call words) to call a scenario stored in the associated scenario set are described. When the scenario is not to be called using voice, a string of nulls are stored in the call word definition field 202.

The scenario file name definition field 203 is disposed to described therein a scenario name stored in the scenario set, namely, a file name of the scenario file 103.

As shown in FIG. 7, the scenario control table 82 includes one record for each scenario. The record includes three fields, these are a scenario category field 301, a call word field 302, and a scenario file name field 303.

The scenario receiver block 74 receives by the data communicator 1 a scenario set via a network (communication line) such as the internet or a digital broadcast and stores the scenario set in the mail storage block 85.

The voice recognition word adder 72 registers words stored in the call word storage block 87 to the voice recognizer dictionary 81.

The scenario register 73 makes a retrieval through the scenario control table 82 for an empty record, stores a scenario category value of the scenario category storage 86 in the scenario category field 301 of the record, writes call words of the call word storage 87 in the call word field 302 of the record, and stores a scenario execution file name of the scenario name storage 88 in the scenario file name field 303. Thereafter, the scenario register 73 stores a scenario file 103 and a data file group 104 of the file storage 89 in the extended scenario storage 84.

The voice recognizer 78 compares the voice (recognition words) inputted to the voice input unit 2 with each word of the voice recognizer dictionary 81 to resultantly detect words matching the voice.

The scenario selector 75 makes a search through the scenario control table 82 to obtain a record matching a specified scenario category or specified recognition words and then stores a record number of the record in the record number storage 90.

The scenario executor 76 makes a retrieval through the system scenario storage 83 and/or the extended scenario storage 84 to obtain a scenario having a file name specified by the scenario file name field 303 of a record of the scenario control table 82, the record being indicated by the record number storage 90. The executor 76 then executes the scenario.

Subsequently, the overall operation of the embodiment will be described in detail by referring to the flowchart shown in FIG. 8.

Figure 8:
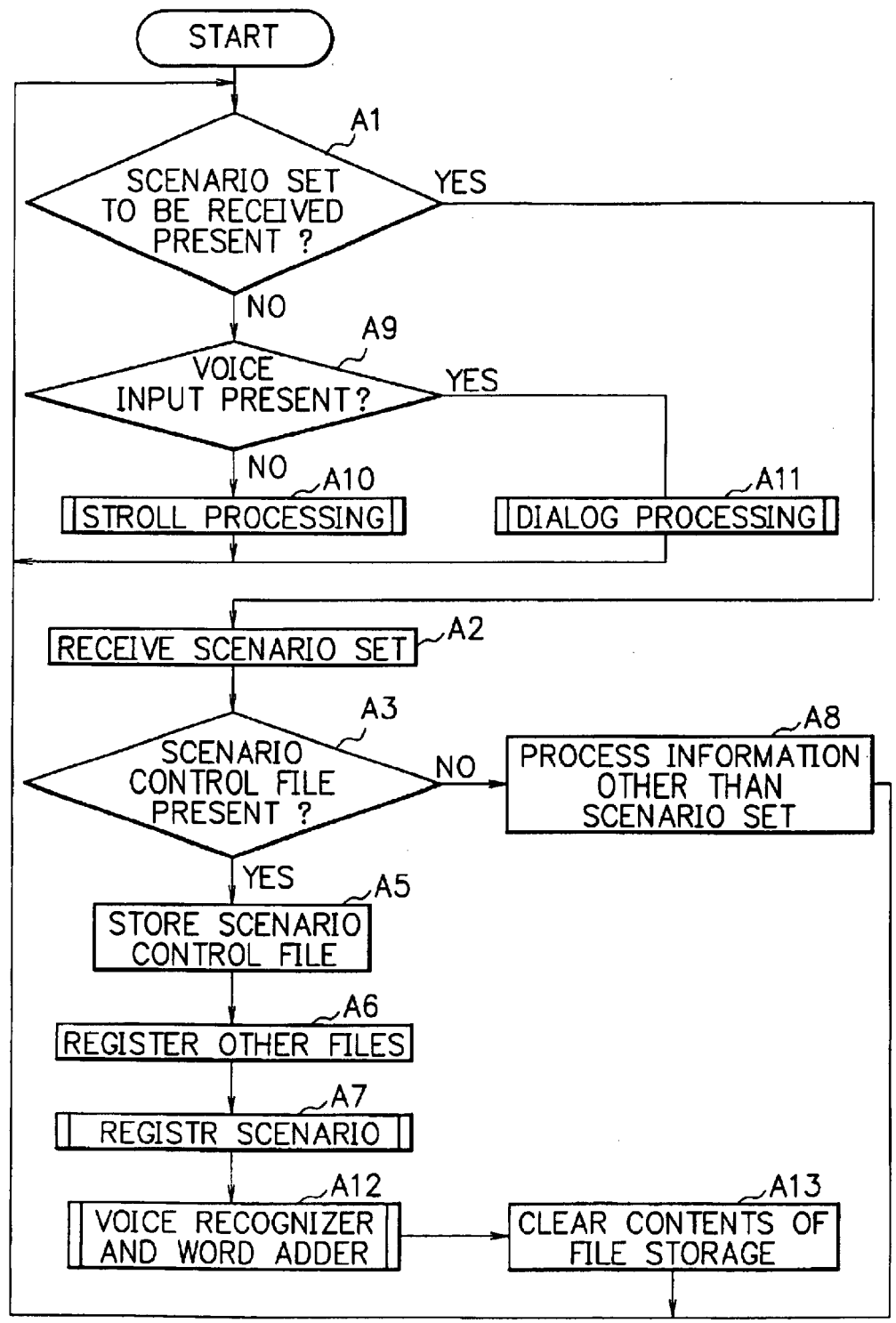
FIG. 8 is a flowchart showing overall operation of the first embodiment in accordance with the present invention.

As can be seen from FIG. 8, the scenario receiver 74 establishes connection via the data communicator 1 to the network to determine whether or not a scenario set to be received is present (step A1). If such a scenario is present (yes in step A1), the scenario receiver 74 receives the scenario set (step A2).

The scenario receiver 74 receives the scenario set, for example, by electronic mail. In this case, the scenario receiver 74 establishes connection to a mail server on the Internet and receives an e-mail letter to the robot. The operation is almost the same as the ordinary operation to receive a letter by Internet mail and hence detailed description thereof will be avoided. Alternatively, the scenario receiver 74 may receive the scenario set via a data communication path of an analog broadcast. When the analog broadcast is used, the scenario receiver 74 may use a vertical blanking interval (VBI) in the broadcast. In this case, the operation of the scenario receiver 74 is substantially the same as the ordinary data receiving operation using the VBI, and hence detailed description thereof will be avoided. In further another example, there can be considered an embodiment of the present invention in which the scenario receiver 74 receives the scenario set from a file transfer protocol (ftp) server on the internet. In this situation, since the operation of the scenario receiver 74 is similar to that of the ordinary ftp reception, the detailed description thereof will be avoided. The scenario receiver 74 may also receive the scenario set according to a hypertext transfer protocol (HTTP). Since, the operation of the scenario receiver 74 is substantially the same as the ordinary http receiving operation in this case, detailed description thereof will be avoided.

Next, the scenario receiver 74 determines whether or not the scenario set includes a scenario control file 102 (step A3). If the file 102 is included (yes in step A3), the received information is a scenario set. The scenario receiver 74 stores a scenario category value described in the scenario category definition 201 of the scenario control file 102 in the scenario category storage 86, writes call words described in the call word definition 202 in the call word storage 87, and stores a scenario execution file name described in the scenario file name definition 203 in the scenario file name storage 88 (step A5). The scenario receiver 74 stores a scenario file 103 as scenario execution files and a data file group 104 contained in the scenario set in the file storage 89 (step A6). The scenario receiver 74 then calls the scenario register 73 (step A7). The scenario receiver 74 calls the voice recognition word adder 72 (step A12), and then removes or clears the contents of the file storage 89 (step A13).

When the scenario control file is not contained (no in step A3), the received information is other than a scenario set, and hence the scenario receiver 74 executes processing according to the information (step A8). For example, in an embodiment to receive a scenario set by e-mail, when the received information is an ordinary e-mail letter, the step is executed, for example, to conduct a voice synthesizing operation for the letter. Resultantly, the voice output unit 4 produces voice for the received information.

When there exists no scenario set to be received (no in step A1), the scenario receiver 74 determines whether or not a voice input from the voice input unit 2 is present (step A9). If such a voice input is absent (no in step A9), the scenario receiver 74 calls the stroll processing (step A10). If a voice input is present (yes in step A9), the scenario receiver 74 calls the dialog processing (step A11).

Referring next to the flowchart of FIG. 9, description will be given of operation of the scenario register 73.

Figure 9:
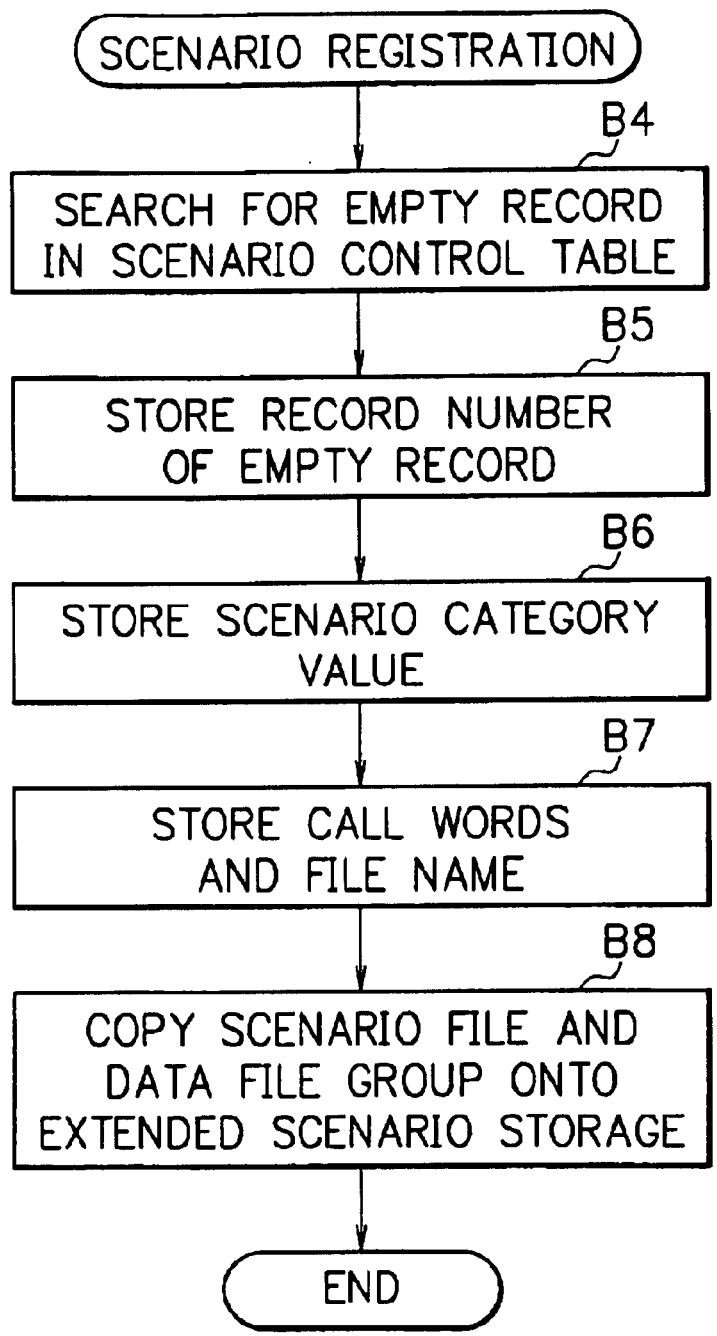
FIG. 9 is a flowchart showing operation of a scenario registering block in the first embodiment.

As shown in FIG. 9, the scenario register 73 makes a search through the scenario control table 82 for an empty record (step B4). If such an empty record is present, the scenario register 73 stores a record number of the record in the record number storage 90 (step B5) and writes a scenario category value written in the scenario category storage 86 in a scenario category field of the record (step B6).

The scenario register 73 stores call words written in the call word storage 87 in the call word field 302 of a record of the scenario control table 82 having the record number indicated by the record number storage 90, and writes a scenario execution file name written in the scenario file name storage 88 in the scenario file name field 303 (step B7). The scenario register 73 further stores the scenario file 103 and the data file group 104 written in the file storage in the extended scenario storage 84 (step B8).

Referring now to the flowchart of FIG. 14, operation of the voice recognition word adder 72 will be described.

Figure 14:
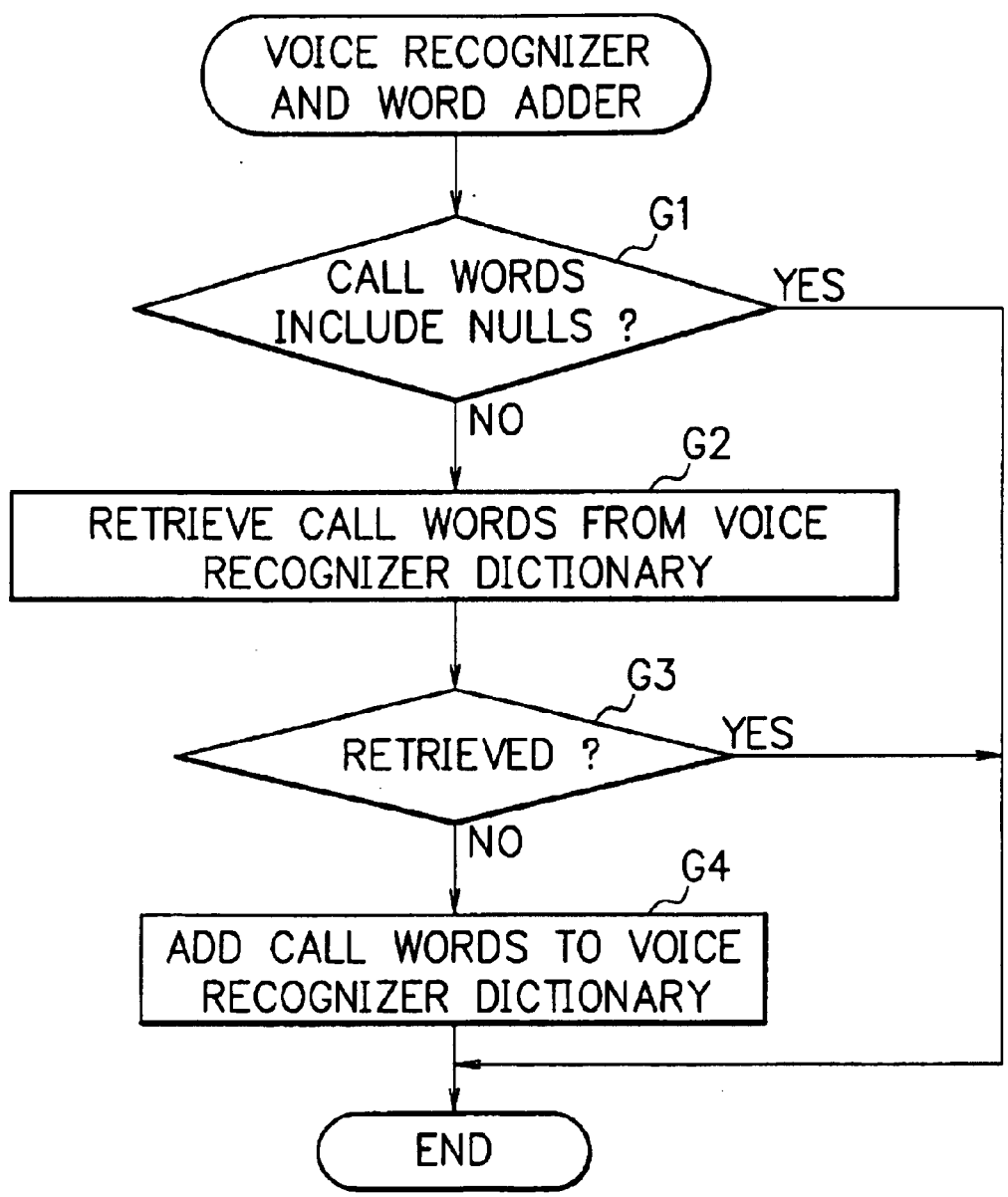
FIG. 14 is a flowchart showing operation of voice recognition word adder block in the first embodiment in accordance with the present invention.

As can be seen from FIG. 14, the voice recognition word adder 72 determines the call words stored in the call word storage 87 are a string of nulls (yes in step G1). If this is the case (yes in step G1), the recognizer and adder 72 terminates the processing. Otherwise (no in step G1), the recognizer and adder 72 makes a retrieval through the voice recognizer dictionary 81 to determine whether or not the call words stored in the call word storage 87 have already been registered to the dictionary 81 (step G2). If the call words have already been registered (yes in step G3), the recognizer and adder 72 terminates the processing. Otherwise (no in step G3), the recognizer and adder 72 adds the call words to the dictionary 81 (step G4).

Next, operation of the stroll processing will be described by referring to the flowchart shown in FIG. 10.

Figure 10:
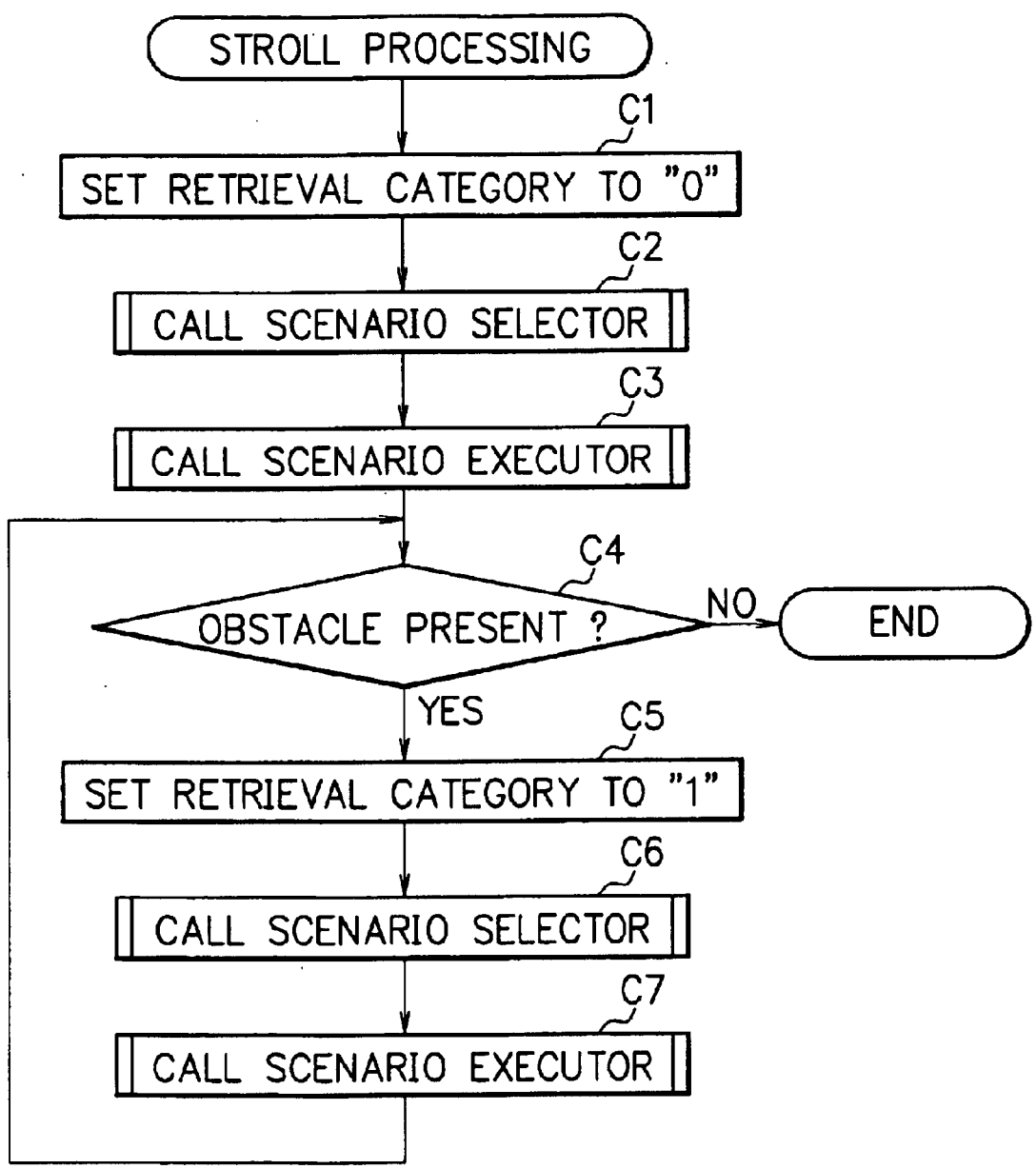
FIG. 10 is a flowchart showing operation of stroll processing in the first embodiment in accordance with the present invention.

As shown in FIG. 10, the retrieval category value is set to "0" indicating "stroll scenario" (step C1). The scenario selector 75 is then called (step C2).

Thereafter, the scenario executor 76 is called (step C3). A check is made to determine whether or not an obstacle is present in front of the robot (step C4). If such an obstacle is absent (no in step C4), the stroll processing is terminated. If such an obstacle is present (yes in step C4), the retrieval category value is set to "1" indicating "obstacle avoidance scenario" (step C5). The scenario selector 75 is then called (step C6). The scenario executor 76 is called (step C7). A check is again conducted using the ultrasonics sensor 3 to determine whether or not an obstacle is present in front of the robot (step C4).

Referring now to the flowchart of FIG. 11, description will be given of operation of the dialog processing.

Figure 11:
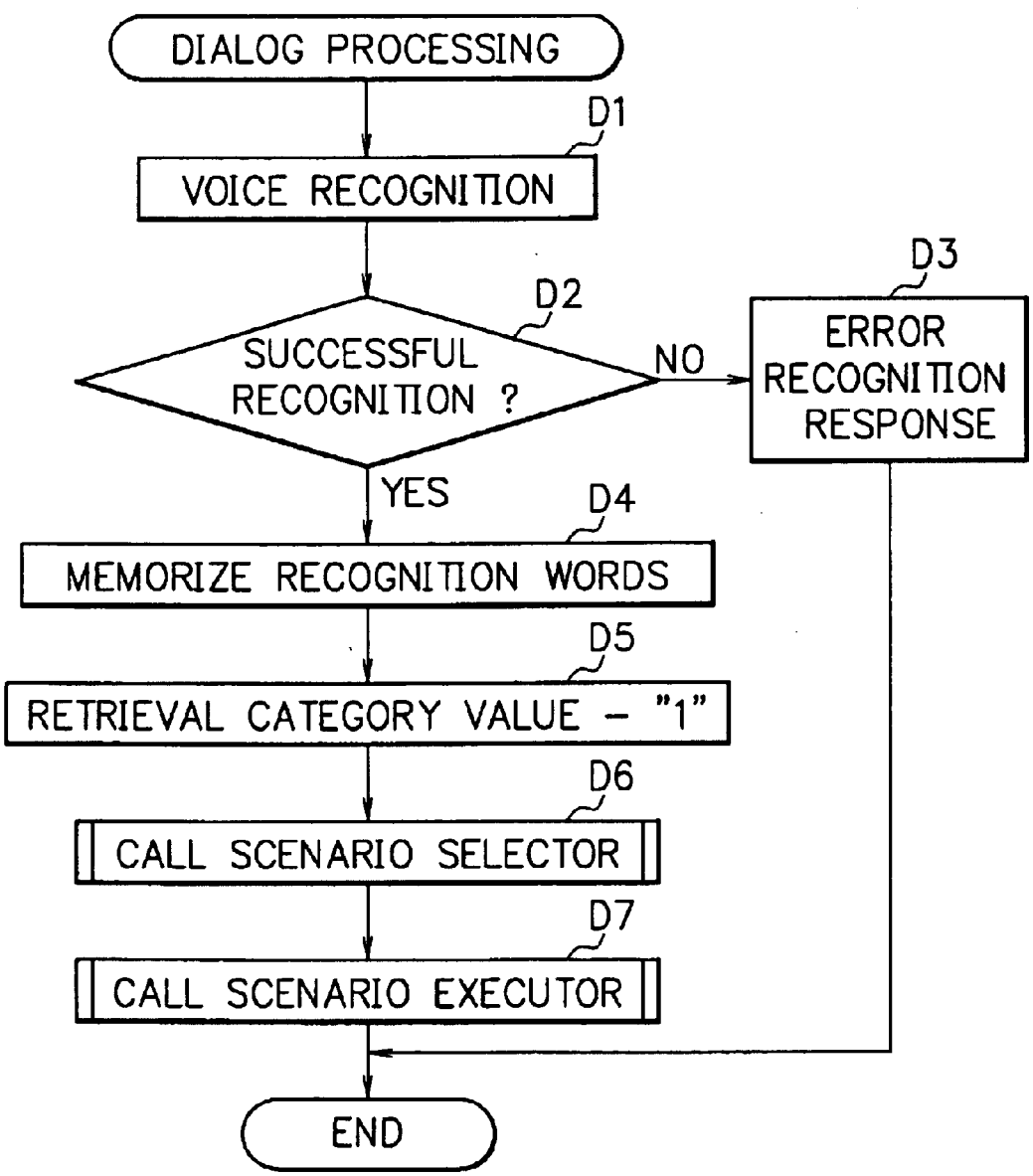
FIG. 11 is a flowchart showing operation of dialog processing in the first embodiment in accordance with the present invention.

As can be seen in FIG. 11, the voice recognizer 78 compares the voice received from the voice input unit 2 with each word in the voice recognizer dictionary 81 to search for words matching the voice (step D1). If such words matching the voice are absent (no in step D2), the voice recognizer 78 issues a voice response, for example, "I don't know the words" (step D3).

If words matching the voice are present (yes in step D2), the voice recognizer 78 stores the words in a recognition result storage 91 (step D4), sets the value of the retrieval category to "−1" (step D5), and calls the scenario selector 75 (step D6). The voice recognizer 78 subsequently calls the scenario executor (scenario executing block) 876 (step D7).

Next, operation of the scenario selector 75 will be described by referring to the flowchart of FIG. 12.

Figure 12:
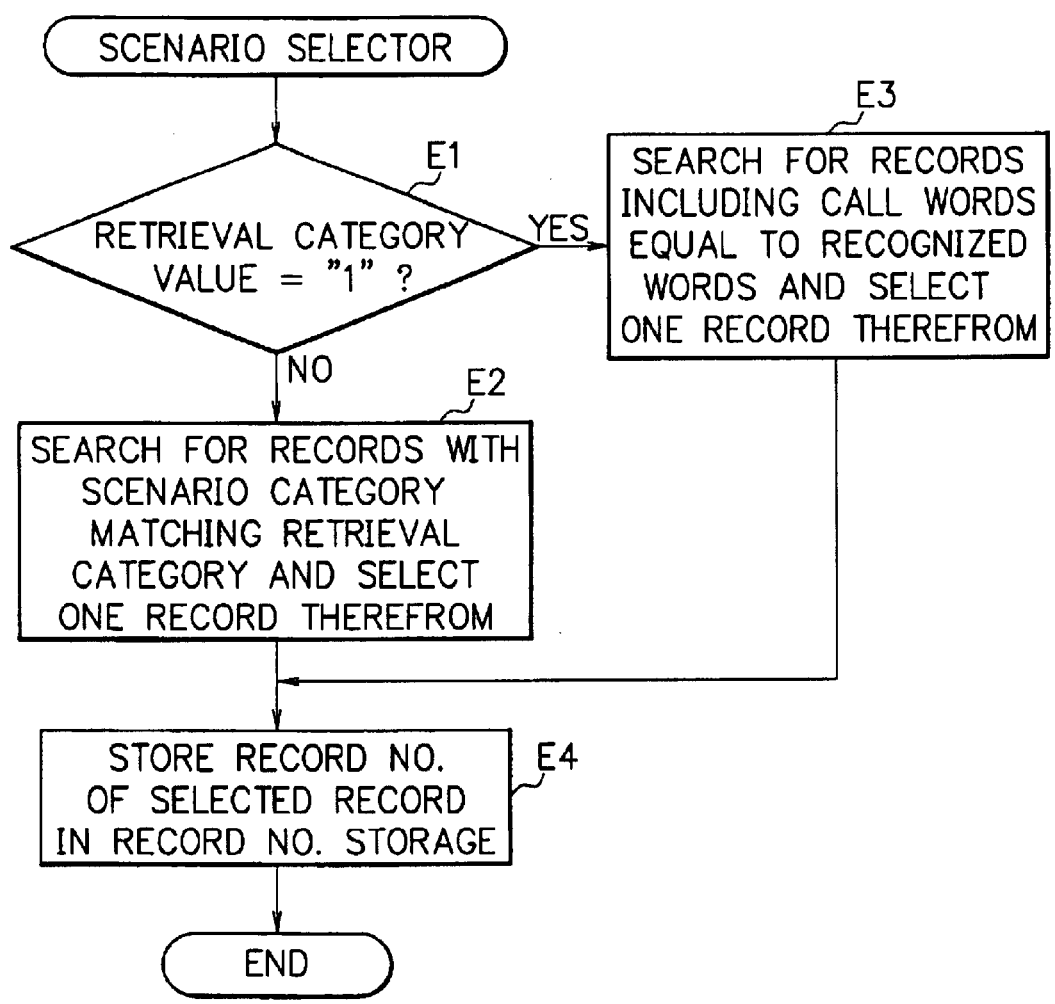
FIG. 12 is a flowchart showing operation of scenario selecting block in the first embodiment in accordance with the present invention.

As shown in FIG. 12, the scenario selector 75 determines whether or not the value of the retrieval category is "−1" (step E1). If the value is not "−1" (no in step E1), the scenario selector 75 selects one of the records from a record group of the scenario control table 82, the group including records each of which has a scenario category field 301 with a value matching the specified retrieval category (step E2) and stores a record number of the selected record in the record number storage 90 (step E4). If the value of the retrieval category is "−1" (yes in step E1), the scenario selector 75 selects one of the records from a scenario control record group of the scenario control table 82, the group including records each of which has a call word field 302 with a value matching the recognition words memorized (step E3) and stores a record number of the selected record in the record number storage 90 (step E4).

Incidentally, since the scenario selector 75 is called with the retrieval category value set to "−1" in the dialog scenario processing, the retrieval is conducted through the scenarios of all categories. For any scenario not to be called by the dialog scenario for execution thereof, when a string of null characters are set to the call word definition field 302 of the scenario control file 82, the scenario cannot be called by the dialog scenario. Conversely, when a scenario is used in the stroll processing and the dialog processing, it is required that "0" is set to the scenario category definition field of the scenario control file corresponding to the scenario and "call words" of the scenario are set to the call word definition field thereof.

Referring next to the flowchart of FIG. 13, operation of the scenario executor 76 will be described.

Figure 13:
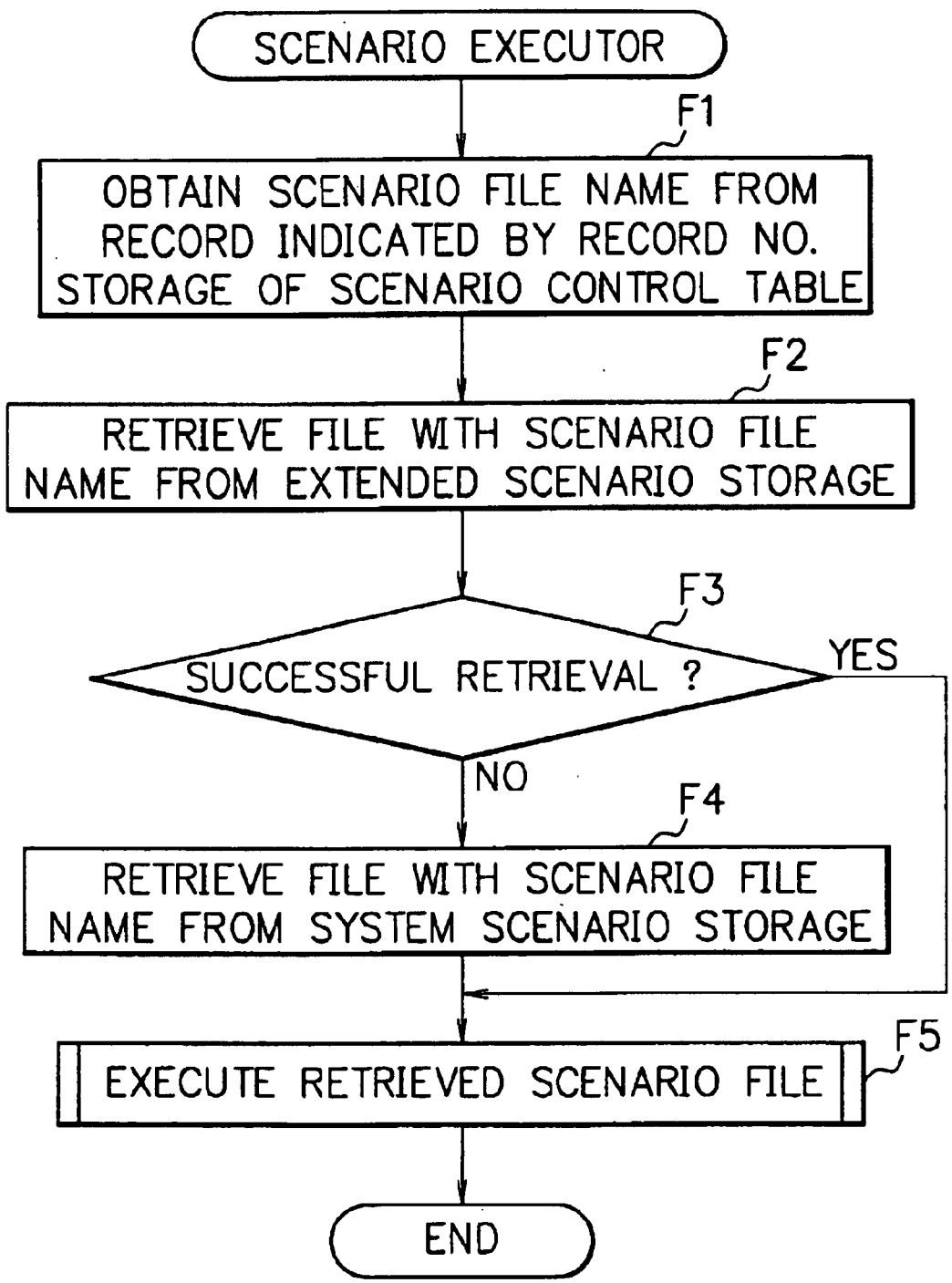
FIG. 13 is a flowchart further showing operation of scenario selecting block in the first embodiment in accordance with the present invention.

As can be seen from FIG. 13, the scenario executor 76 obtains a scenario file name from the scenario file name field 303 of the record indicated by the record number storage 90 in the scenario control table 82 (step F1). The scenario executor 76 makes a search through the extended scenario file storage 84 for a file having the file name (step F2). If the file is present (yes in step F3), the scenario executor executes the file (step F5). Otherwise (no in step F3), the scenario executor 76 makes a retrieval through the system scenario file storage 83 for a file having the file name (step F4) to execute the file (step F5).

Next, according to a specific embodiment, operation of the embodiment will be described.

Figure 15:
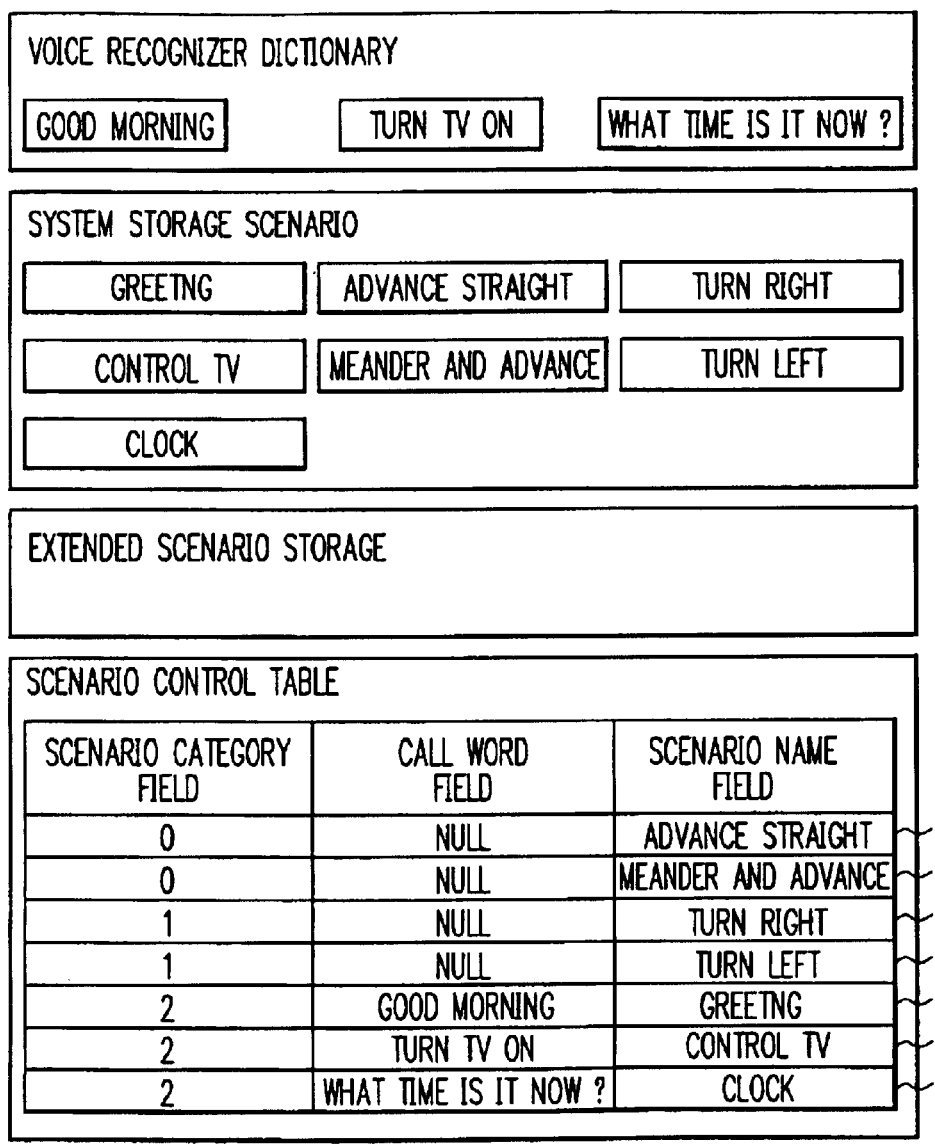
FIG. 15 is a schematic diagram showing a voice recognizer dictionary, a scenario control table, system scenario storage block, and an extended scenario storage block as specific example of operations in the first embodiment in accordance with the present invention.

As can be seen from FIG. 15, in the embodiment, the voice recognizer dictionary 81 of a robot beforehand stores three strings of words, namely, "good morning", "turn TV", and "what time is it now?". In the system scenario storage 83, scenarios (programs) respectively having file names "greeting", "control TV", "clock", "advance straight", "meander and advance", "turn right", and "turn left" are stored in advance. The scenarios are beforehand registered to the scenario control table 82. The extended scenario storage 84 is empty.

The scenario with a file name of "greeting" is a program to achieve a voice response for greeting. The scenario having a file name of "control TV" is a program to transmit a remote control code from an infrared ray emitter, not shown, to a television to turn the television on. The scenario with a file name of "clock" is a program which obtains the present time from a timer unit, not shown, and which produces voice to report the time. The scenarios respectively having file names of "advance straight" and "meander and advance" are respectively a program to advance the robot straight for a predetermined distance by the leg motor 6 and a program which drives the robot by the leg motor 6 such that the robot meanders and advances straight for a predetermined distance. The scenarios respectively with file names of "turn right" and "turn left" are respectively a program to turn the direction of the robot right and a program to turn the direction of the robot left by the leg motor 6.

First, description will be given of an example of operation when the robot is driven in a state in which a scenario set to be received is absent. The operation will be described when an internet mail is used as the scenario receiver unit in this example.

In step A1, the program determines whether or not any received mail is present. Since such a mail is absent, control goes to step A9.

When words "good morning" are supplied to the voice input unit 2, the dialog processing is called (steps A9 and A11). In the dialog processing, the voice recognizer 78 tries to obtain the words from the voice recognizer dictionary 81 (step D1). Since the dictionary 81 contains the words, the words are successfully obtained (step D2) and are memorized or stored (step D4), and "−1" is then set to the retrieval category to call the scenario selector 75 (steps D5 and D6). Since the retrieval category is "−1", the scenario selector 75 searches through the scenario control table 82 to obtain a record with call words equal to recognition words. In this example, only record 5 satisfies the condition and hence a record number of record 5 is stored in the record number storage 90 (steps E1, E3, and E4). The program then calls the scenario executor 76 (step D7) which accesses the scenario control table 82 to obtain a file name of "greeting" from the scenario file name field 303 of the record with a record number of "5" (step F1). Since a file having the file name exists in the system scenario storage 83, the program executes the file (steps F2 to F4). As a result, a greeting message is presented to the operator.

If input data from the voice input unit 2 is absent, the program calls the stroll processing (steps A9 and A10). In the stroll processing, the program sets the retrieval category to "0" indicating the category of the stroll scenario and calls the scenario selector 75 (steps C1 and C2). Since the retrieval category is not "−1", the scenario selector 75 makes a retrieval through the scenario control table 82 to obtain a record with a scenario category equal to the specified retrieval category. In this specific example, since the record numbers "1" and "2" satisfy the condition, either one thereof is selected according to a random number. Assume, for example, that the record number "2" is selected. The value is recorded in the record number storage 90 (steps E1, E2, and E4), and then the scenario executor 76 is called (step D7). The executor 76 accesses the scenario control table 82 to obtain a file name of "meander and advance" from the scenario file name field 303 of a record with record number 2 (step F1). The scenario storage 83 contains a file with the file name, and hence the file is executed (steps F2 to F5). Resultantly, the robot advances or moves forward, while meandering. If an obstacle exists in front of the robot, the scenario "turn right" or "turn left" is retrieved and is executed. When the stroll scenario is often called, the "advance straight" scenario and the "meander and advance" scenario are called at random. Therefore, the robot meanders and advances straight to thereby moves from a position to another position. Similarly, if an obstacle exists before the robot, the scenario "turn right" or "turn left" is retrieved and is executed such that the robot attempts to avoid the obstacle.

When the word "dance" is supplied to the voice input unit 2, the dialog processing is similarly called (steps A1, A9, and A11). In the dialog processing, the voice recognizer 78 makes a search through the voice recognizer dictionary 81 for the word (step D1). Since the word has not been registered to the dictionary 78, the search fails (step D2), and an error response of "I don't know the word" is issued (step D3).

Assume that a scenario, for example, a scenario for the dance is sent via the internet to the robot by e-mail. As shown in FIG. 16, the scenario set includes an empty mail letter, a scenario control file, a scenario file having a name of "dance execution", and a music file of "dance accompaniment". In the scenario control file beforehand includes "2" in the scenario category definition 201 to indicate a dialog scenario, a character string of "dance" assigned by the scenario writer as a recognition word to call the scenario in the call word definition 202, and a character string "dance execution" in the scenario file name definition 203. The file with a file name of "dance execution" is a program which drives the robot to dance. Specifically, the program moves the head and legs of the robot respectively by the head motor 5 and the leg motor 6 and simultaneously sounds a music piece from the voice output unit 4 using the file "dance accompaniment".

Returning to the flowchart of FIG. 8, when the scenario set is sent to the mail server by e-mail, the scenario receiver unit receives the scenario set (steps A1 and A2). Since the scenario set contains the scenario control file 102, the scenario category value "2" written in the scenario category definition 201 of the scenario control file 102 is stored in the scenario category storage 86, the call word "dance" described in the call word definition 202 is stored in the call word storage 87, and the execution file name "dance execution" of the scenario described in the scenario file name definition 203 is stored in the scenario file name storage 88 (step A5). Subsequently, the scenario file 103 and the data file group 104 contained in the scenario set, namely, the "dance execution" file and the "dance accompaniment" file are stored in the file storage 89 (step A6). Thereafter, the program calls the scenario register 73 (step A7).

As shown in FIG. 9, the scenario register 73 retrieves an empty record from the scenario control table 82 (step B4), stores a record number thereof, namely, "8" in the record number storage 90 (step B5), and writes the scenario category value "2" written in the scenario category storage in the scenario category field of the record (step B6). The scenario register 73 stores the call word "dance" written in the call word storage 87 in the call word field 302 of the record 8 in the scenario control table 82 and the scenario execution file name "dance execution" written in the scenario file name storage 88 in the scenario file name field 303 (step B7). The scenario register 73 stores the "dance execution" file and the "dance accompaniment" file written in the file storage 89 in the extended scenario storage 84 (step B8).

Referring again to FIG. 8, the program calls the voice recognition word adder 72 (step A12). Since the call word "dance" written in the call word storage 87 is other than a string of nulls, the voice recognition word adder 72 determines whether or not the voice recognizer dictionary 81 has already stored the call word (steps G1 and G2). Since the call word has not yet been registered to the dictionary 81, the program adds the call word to the dictionary 81 (steps G3 and G4).

Resultantly, as can be seen from FIG. 17, the word "dance" is added to the voice recognizer dictionary 81, information of the "dance execution" file received by e-mail is additionally written in the scenario control table 82, and the "dance execution" scenario and the "dance accompaniment" file used by the scenario are added to the extended scenario storage 84.

When the words "good morning" are again supplied to the voice input unit 2, since a scenario corresponding to the words are not added yet, the "greeting" scenario is again executed.

On the other hand, when words "dance" are supplied to the voice input unit 2, since these words already exist in the voice recognizer dictionary 81, the retrieval is successfully carried out (yes in step D2) and then steps D4 and D5 are executed to thereafter call the scenario selector 75. The scenario selector 75 makes a search through the scenario control table 82 for a record having a call word matching "dance". Since the call word has been added to the record with a record number of "8", the scenario executor 76 obtains the scenario file name "dance execution" from the record. Since the extended scenario storage 84 contains a file having the file name, the program calls the "dance execution" file and executes the file. As a result, "dance execution" received via e-mail and added to the system is executed. In other words, the action of a dance which cannot be performed by the robot of the prior art can be achieved in the embodiment.

Assume that an item of FIG. 18 is received by e-mail. The item includes the call words "good morning" and a "greeting 2" scenario. The scenario makes a response other than that of the "greeting" scenario.

Resultantly, as shown in FIG. 19, information of the "greeting 2" scenario is added to the scenario control table 82 and the greeting 2" scenario is written in the extended scenario storage 84. Since the voice recognizer dictionary 81 already contains the recognition words "good morning", the contents of the dictionary 81 are kept unchanged.

When the operator says "good morning" again at this point of time, since the scenario control table 82 contains two records each of which has "good morning" in its call word field, the scenario selector 75 selects one of the records. The selection is conducted according to a random number in the embodiment. That is, the "greeting" scenario or the "greeting 2" scenario is selected according to the random number and is then executed by the scenario executor.

Similarly, Assume that a scenario set having a scenario category of "0" and a scenario file of "move backward" is received by email to be incorporated in the system. Assume that the scenario file is a program which turns the robot to face the rear side and which then drives the robot to move for a predetermined distance. As a result, since the program can select either one of the "advance straight" scenario, the "meander and advance" scenario, and the "move backward" scenario according to the random number. When compared with the prior art in which only two scenarios, namely, the "advance straight" scenario and the "meander and advance" scenario are used, the robot conducts actions of "advance forward", "meander and advance", and "move backward".

Next, advantages of the embodiment will be described. Since a scenario can be received via a network to be added to the system in the embodiment, a new scenario can be easily added to the robot.

In the embodiment, since a new scenario received from a network can be called by a new recognition word, a scenario added to the system can be flexibly called.

Additionally, a new scenario can be added to an existing scenario when these scenarios have an equal category. Therefore, for an action of the robot, it is easy to create variations of the action.

Subsequently, description will be given in detail of a second embodiment in accordance with the present invention by referring to the accompanying drawings.

Second embodiment

Figure 20:
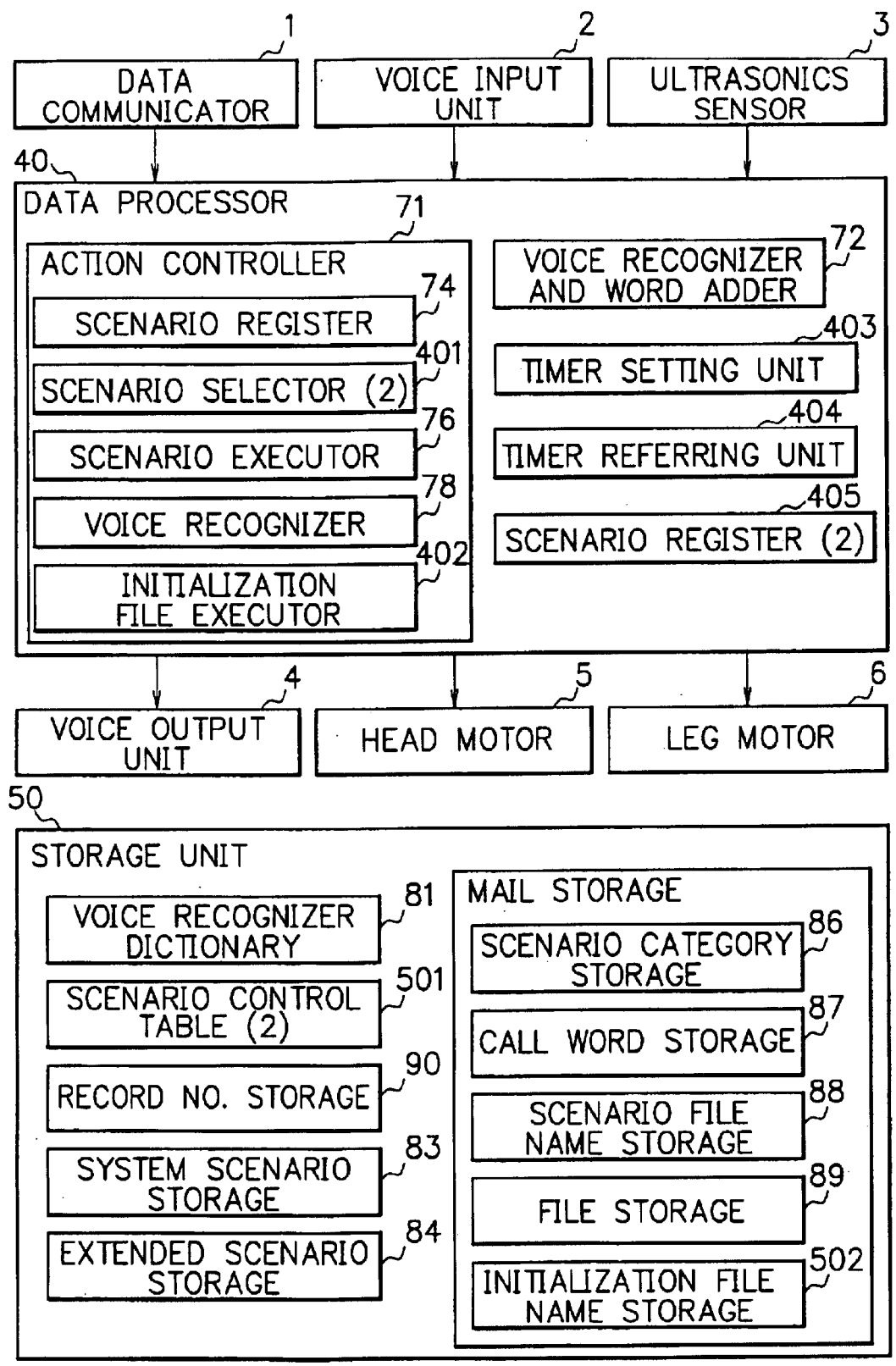
FIG. 20 is a schematic block diagram showing constitution of a second embodiment in accordance with the present invention.

As can be seen from FIG. 20, the second embodiment of the present invention differs from the first embodiment of FIG. 5 as follows. In the data processor, the scenario register 73 and the scenario selector 75 of the first embodiment are respectively replaced with a scenario register (2) 405 and a scenario selector (2) 401 and an initialization scenario executor 402, a timer setting unit 403, and a timer referring unit 404 are additionally included in the second embodiment. Moreover, the scenario control table 82 of the first embodiment is substituted for a scenario control table (2) 501 and an initialization file name storage 502 is additionally disposed in the mail storage.

Figure 21:
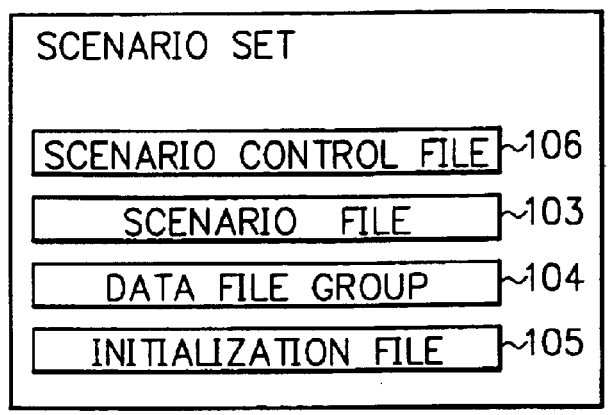
FIG. 21 is a diagram showing a scenario set and a scenario control file in the second embodiment in accordance with the present invention.

Referring now to FIG. 21, when compared with the scenario set in the first embodiment of the present invention, the scenario set of the second embodiment additionally includes an initialization file 105 and the scenario control file includes an initialization name definition 204.

Figure 22:
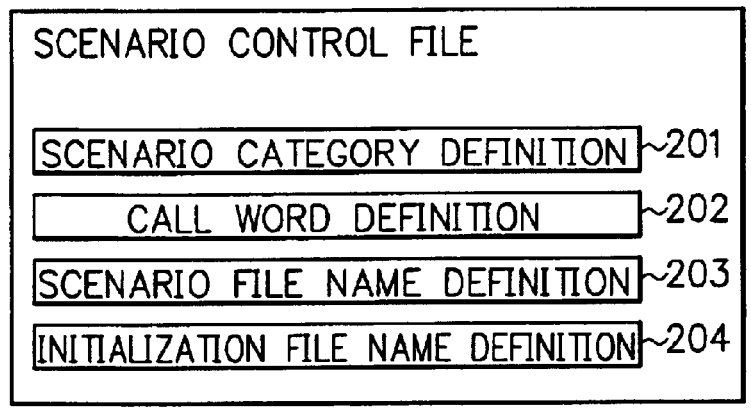
FIG. 22 is a diagram showing a scenario control table in the second embodiment in accordance with the present invention.

As can be seen from FIG. 22, the scenario control table (2) differs in constitution from the scenario control table 82 of the first embodiment shown in FIG. 7 in that the scenario control table (2) additionally includes an execution time field 304.

The initialization file executor 402 calls an initialization file having a file name written in the initialization file name storage 502 from the file storage 89 and then executes the initialization file.

The timer setting unit 403 is disposed in a form of a library such that the timer setting unit 403 can be called from a scenario file or an initialization file. The unit 403 stores the specified time to the execution time field 304 of a record indicated by the record number storage 90 of the scenario control table (2) 501.

The timer referring unit 404 compares the present time with the execution time written in the execution time field 304 of each record in the scenario control table (2) 501. If there exists a record for which the present time equals to the execution time, the time referring unit 404 stores a record number of the record in the record number storage 90. Otherwise, the unit 404 writes "−1" in the record number storage 90.

The scenario register (2) 405 retrieves an empty record in the scenario control table (2) 501. If such a record is retrieved, the scenario register(2) 405 writes the scenario category value stored in the scenario category storage 86 in the scenario category field of the record, stores the call words written in the call word storage 87 in the call word field 302 of the record, and writes a scenario execution file name stored in the scenario file name storage 88 in the scenario file name field 303 of the record. The scenario register (2) 405 registers a value, for example, "−1" indicating "not set yet" in the execution time field 304 of the record. The register (2) 405 writes the scenario file 103 and the data file group 104 stored in the file storage 89 in the extended scenario storage 84.

The scenario selector (2) 401 retrieves a scenario file corresponding to the specified scenario category or specified recognition words from the scenario control table (2) 501. If the record is retrieved, the scenario selector (2) 401 writes a record number of the record in the record number storage 90. Excepting that the scenario control table (2) 501 is used in place of the scenario control table 82, the scenario selector (2) 401 operates substantially in the same manner as for the scenario selector of the first embodiment shown in FIG. 12.

Referring now to the flowchart of FIG. 23, description will be given in detail of an overall operation of the embodiment in accordance with the present invention.

Figure 23:
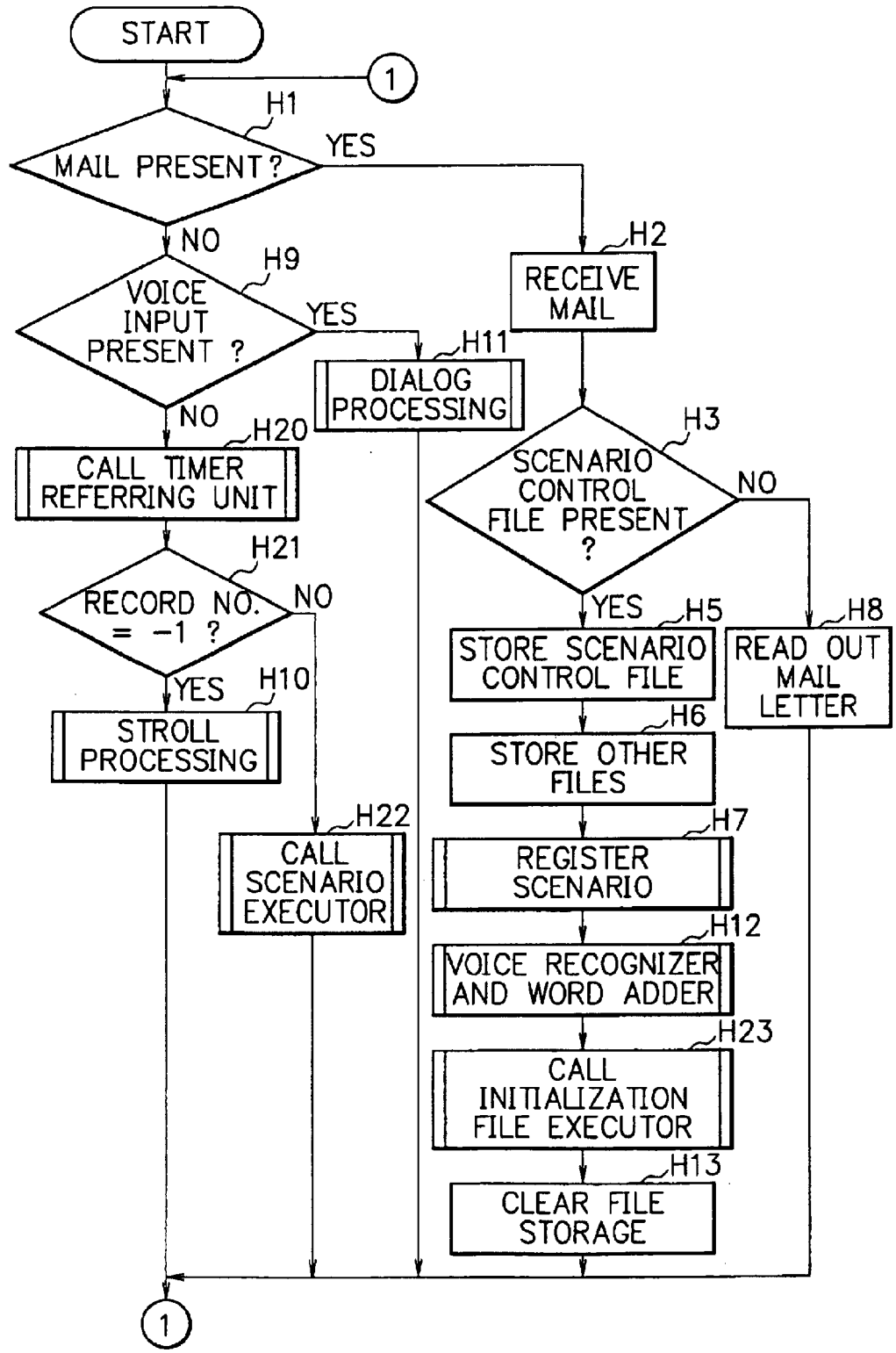
FIG. 23 is a flowchart showing overall operation of the second embodiment in accordance with the present invention.

As can be seen from FIG. 23, the scenario receiver 74 establish connection via the data communicator 1 to the network to determine whether or not a scenario set sent to the robot is present (step H1). If such a scenario set is present (yes in step H1), the scenario receiver 74 receives the scenario set (step H2). The scenario receive 74 then determines whether or not the scenario set contains a scenario control file 106 (step H3). If this is the case (yes in step H3), the scenario receiver 74 writes the scenario category value stored in the scenario category definition 201 of the scenario control file 106 in the scenario category storage 86, stores the call words written in the call word definition 202 in the call word storage 87, writes the scenario initialization file name described in the initialization file name definition 204 in the initialization file name storage 502, and stores the scenario execution file name described in the scenario file name definition 88 in the scenario file name storage 88 (step H5). The scenario receiver 74 writes the scenario file 103, the initialization file 105, and the data file group 104 contained in the scenario set in the file storage 89 (step H6). The scenario receiver 74 calls the scenario register (2) 405 (step H7), the voice recognition word adder 72 (step H12), and the initialization file executor 402 (step H23). The scenario receiver 74 then clears the contents of the file storage 89 (step H13).

If the scenario control file 106 is not contained in the scenario set (no in step H3), the received information is other than a scenario set, and hence the system executes processing according to the information (step H8).

If there is not scenario set to be received (no in step H1), the scenario receiver 74 determines whether or not a voice input from the voice input unit 2 is present (step H9). If the voice input is absent (no in step H9), the receiver 74 calls the timer referring unit 404 (step H20). If the value stored in the record number storage 90 is other than "−1" (no in step H21), the receiver 74 calls the scenario executor 76 (step H22). If the value is "−1" (yes in step H21), the receiver 74 calls the stroll processing (step H10). If the voice input is present (yes in step H9), the receiver 74 calls the dialog processing (step H11).

Next, operation of the scenario register (2) 405 will be described by referring to the flowchart of FIG. 24.

Figure 24:
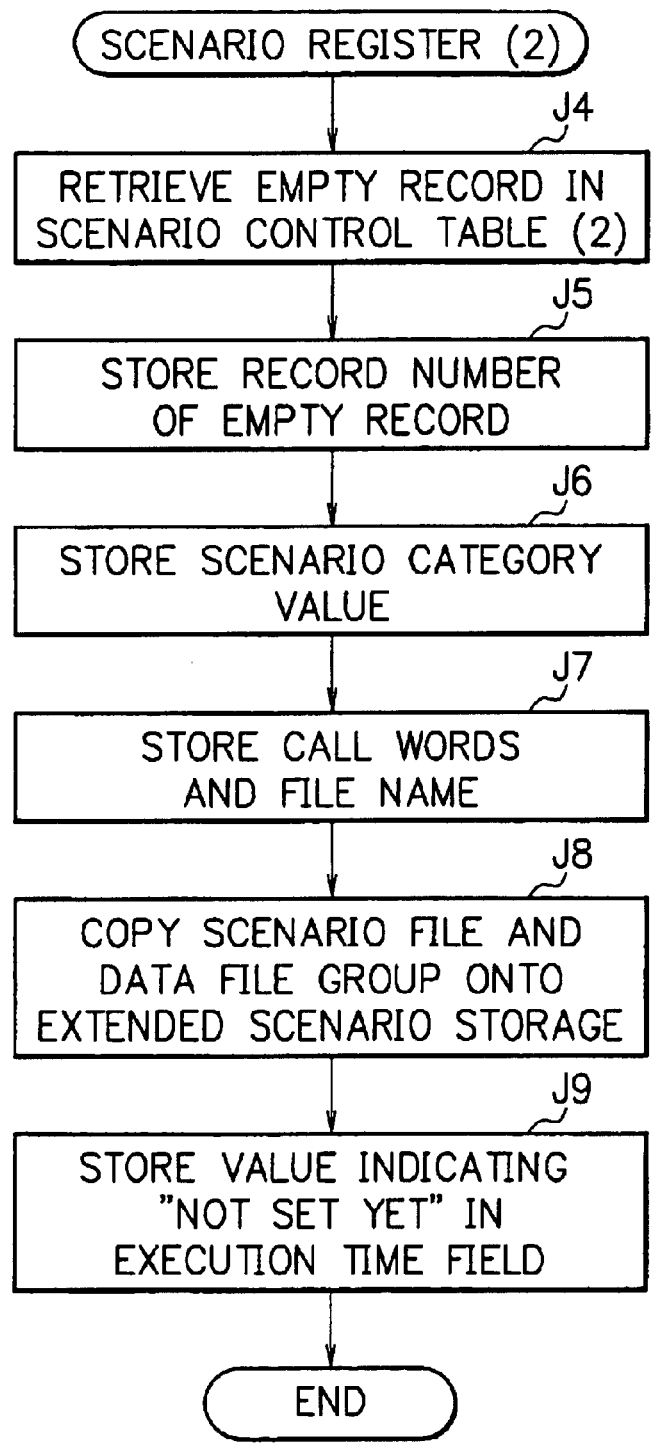
FIG. 24 is a flowchart showing operation of a scenario registering block in the second embodiment in accordance with the present invention.

As shown in FIG. 24, the scenario register (2) 405 retrieves an empty record from the scenario control table (2) 502 (step J4), writes a record number of the record in the record number storage 90 (step J5), and then stores the scenario category value written in the scenario category storage 86 in the scenario category field of the record (step J6).

The scenario register (2) 405 writes the call words stored in the call word storage 87 in the call word field 302 of a record having the record number indicated by the record number storage 90 of the scenario control table (2) 50 and then stores the scenario execution file name written in the scenario file name storage 88 in the scenario file name field 303 (step J7). The scenario register (2) 405 writes the scenario file 103 and the data file group 104 stored in the file storage 89 in the extended scenario storage 84 (step J8). The scenario register (2) 405 registers a value, e.g., "−1" indicating "not set yet" in the execution time field 304 of the record (J9).

Referring now to the flowchart of FIG. 25, operation of the initialization file executor 402 will be described.

As shown in FIG. 25, the initialization file executor 402 acquires a file having the file name stored in the initialization file name storage 502 from the file storage 89 and executes the file (step K1).

The contents of the initialization file are an arbitrary program executable by the data processor 7. The program ordinarily includes processing which converses with the user through voice recognition or the like to determine a point of time to execute an execution file of a scenario set including the program. The determined point of time is registered to the system by calling the timer setting unit 403 with the point of time set as an argument (step K2).

Figure 26:
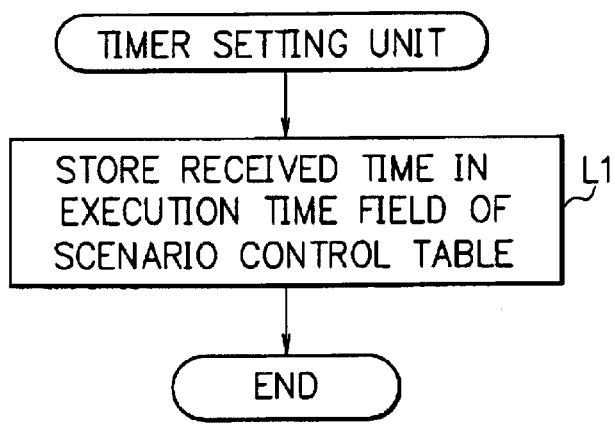
FIG. 26 is a flowchart showing operation of a timer setting block in the second embodiment in accordance with the present invention.

Referring to FIG. 26, the timer setting unit 403 stores the received point of time in the execution time field 304 of a record indicated by the record number storage 90 of the scenario control table (2) 501 (step L1).

Like an initialization file, an execution file may also contain a program which determines an execution point of time of an execution file through, for example, a conversation with the user. When such a program is included in an execution file, the timer setting unit 403 can be called not only from an initialization file but also from the execution file.

That is, the subsequent execution time of a scenario can be changed as follows. During the execution of an execution file, the subsequent execution time is determined through conversation again with the user through voice recognition or the like. By calling the timer setting unit 403 with the execution time set as an argument, the execution time of the scenario is changed.

Next, operation of the timer referring unit 404 will be described by referring to the flowchart of FIG. 27.

Figure 27:
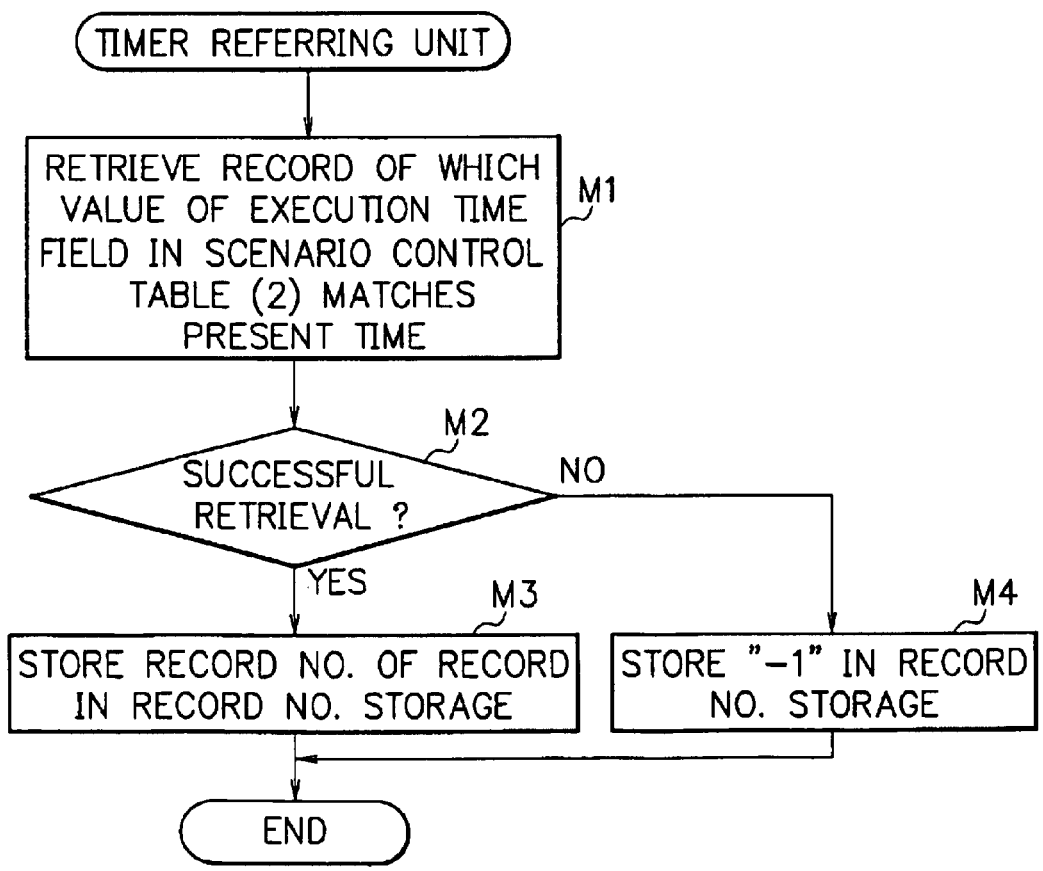
FIG. 27 is a flowchart showing operation of a timer referring block in the second embodiment in accordance with the present invention.

As can be seen from FIG. 27, the timer referring unit 404 accesses the scenario control table (2) 501 to retrieve therefrom a record of which the execution time field contains a value matching the present time (step M1). If such a record is present (yes in step M2), a record number of the record is stored in the record number storage 90 (step M3). Otherwise (no in step M2), "−1" is stored in the record number storage 90 (step M3).

In a scenario which is not required to be automatically executed at a point of particular time, the initialization file is prepared not to call the timer setting unit. In this situation, the execution time field of the record corresponding to the scenario in the scenario control table (2) 501 is set to "−1" by the scenario register (2) 405 and is kept unchanged. Therefore, the value does not match the present time in any case, and hence the timer referring unit 404 does not set the record number to the present record storage. As a result, the scenario is not automatically executed at a particular point of time.

The stroll processing and the dialog processing of the embodiment are substantially and respectively equal to those of the first embodiment (FIGS. 6 and 7).

Additionally, while the first embodiment uses the scenario control table 82, the second embodiment uses the scenario control table (2) 501.

Advantages of the embodiment will be described.

In addition to the advantages of the first embodiment, the second embodiment has advantages as follows. In the embodiment, a new scenario in which an execution time thereof can be set through conversation with the user for automatic execution thereof at the execution time can be added to the robot. Therefore, a new function to automatically start execution of a scenario at a predetermined execution time can be easily added to the system.

Third embodiment

Referring next to the drawings, description will be given of a third embodiment in accordance with the present invention.

Figure 28:
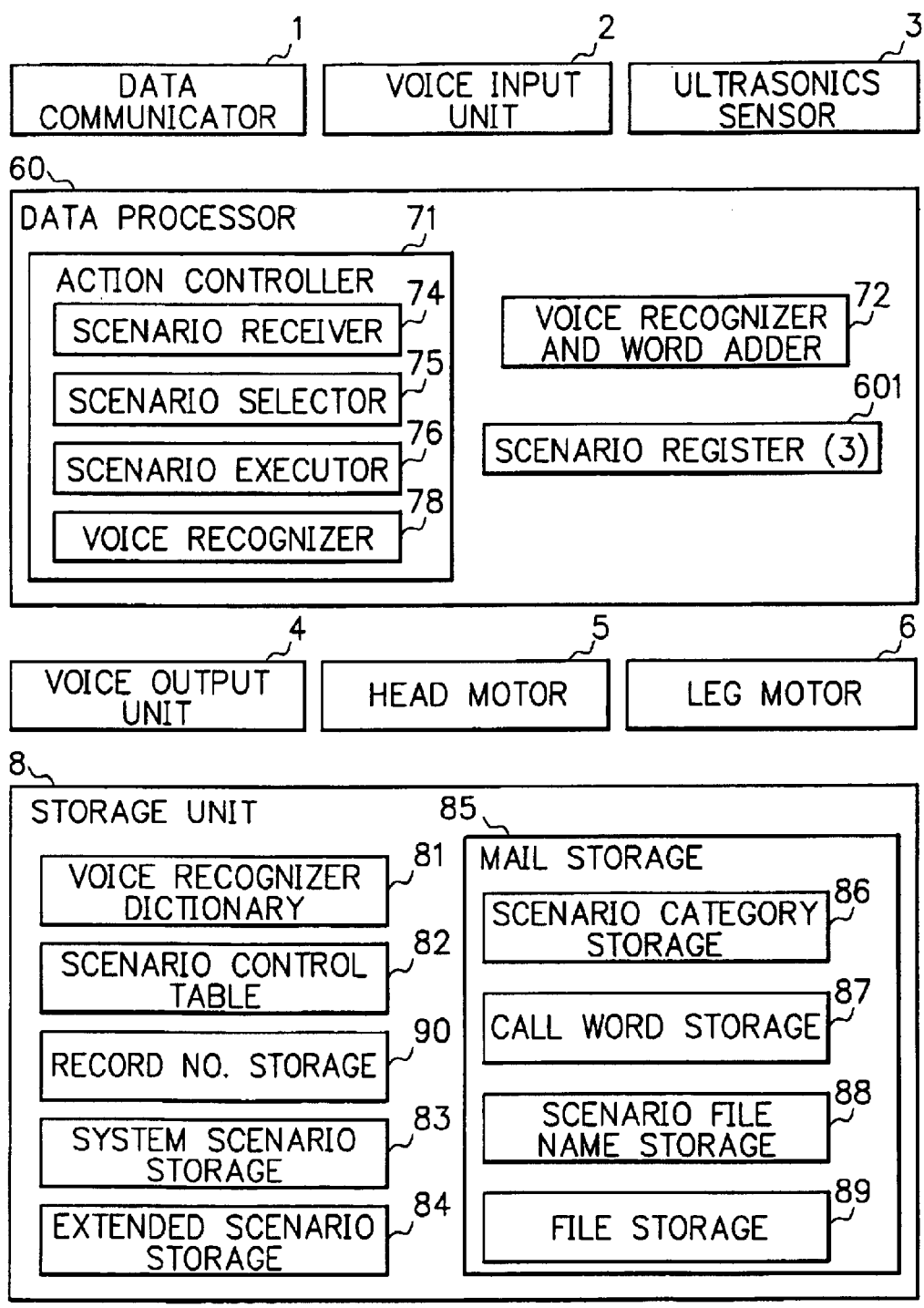
FIG. 28 is a schematic block diagram showing a configuration of a third embodiment in accordance with the present invention.

As can be seen from FIG. 28, in the configuration of the third embodiment, the scenario register 73 of the data processor in the first embodiment shown in FIG. 5 is replaced with a scenario register (3) 601.

The scenario control file in the third embodiment is in constitution substantially equal to that of the first embodiment shown in FIG. 6. However, in the third embodiment, the value which can be stored in the scenario category definition 201 is 0, 1, 2, and 3. In the first embodiment, the values are 0, 1, and 2.

When the scenario category is "3", the scenario is not registered to the scenario control table 82 and the extended scenario storage 84, but is once executed only when the scenario set is received. The scenario is discarded after the execution thereof.

The processing is implemented by the scenario register (3) 601. Operation of the scenario register (3) 601 will be described by referring to FIG. 29.

Figure 29:
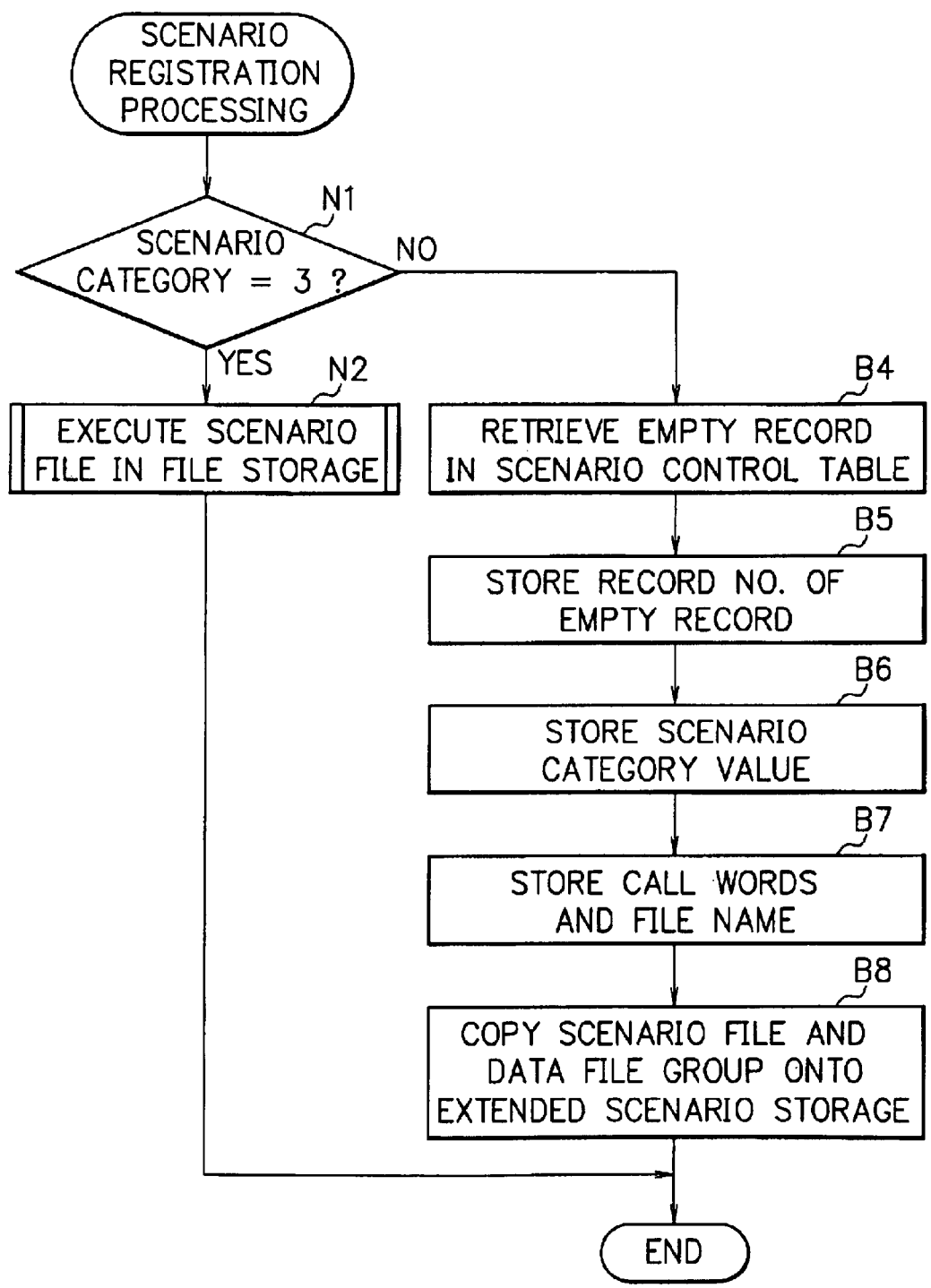
FIG. 29 is a flowchart showing a scenario registering block in the third embodiment in accordance with the present invention.

As shown in FIG. 29, the scenario register (3) 601 determines whether or not the scenario category stored in the scenario category storage 86 is "3" (step N1).

If the scenario category is other than "3" (no in step N1), control goes to step B4. Operation of step B4 and subsequent steps is substantially the same as that of the first embodiment, and hence description thereof will be avoided.

If the scenario category is "3" (yes in step N1), the scenario register (3) 601 acquires the scenario file 103 having a named scenario file stored in the scenario file name storage 88 and then executes the scenario execution file 103 (step N2).

In the third embodiment described above, there is conducted, in addition to the operation of the first embodiment, an operation as below. A scenario which is automatically executed at reception thereof and which is not registered to any place after the execution thereof is received to be executed in the third embodiment. Therefore, the storage area can be efficiently used.

Moreover, in the third embodiment, when a scenario set is received, the scenario can be immediately executed. Consequently, a scenario which can be executed without any call from the user in any situation can be sent to the robot. Particularly, when the robot executes a scenario regarding an advertisement, it is possible that the contents of the advertisement can be notified without any call from the user, and hence the effect of the advertisement is advantageously increased.

According to a first aspect of the present invention, a new function can be added to and executed in the robot for the following reason. A new scenario can be received from a network to be added to a robot control program so that the new scenario is executed in the robot.

According to a second aspect of the present invention, it is possible to response to a new recognition word for the following reason. A new scenario and a recognition word to call the new scenario can be received from a network, and the recognition word can be added to a voice recognizer dictionary and the scenario can be registered so that the scenario is executed using the recognition word.

According to a third aspect of the present invention, it is possible to increase variations of the response to one recognition word for the following reason. As a response to one recognition word, a scenario to be called by a recognition word originally incorporated in the robot control program or a scenario to be executed by a new recognition word received from the network can be selected to be executed by the recognition word.

According to a fourth aspect of the present invention, it is possible to increase patterns of an autonomous action such as "stroll" of the robot for the following reason.

As a scenario including basic patterns of autonomous actions, a scenario originally incorporated in the robot control program or a new scenario received from the network can be selected for execution thereof.

According to a fifth aspect of the present invention, it is possible to add a new function which can be automatically executed at a time desired by the user.

This is implemented as follows. When a new scenario is received from the network, an initialization file contained in the scenario is executed such that the initialization file, for example, converses with the user to set an execution time such that the scenario is called at the execution time.

According to a sixth aspect of the present invention, it is possible to minimize the storage area required for a scenario which is only once executed at reception thereof from the network.

This is because a scenario which is executed at reception thereof and which is not registered and which is discarded after the execution thereof can be received to be executed in the system. Therefore, the storage area can be efficiently used.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A robot, comprising:
   receiver means for receiving a new robot control program module from a communication line;
   register means for adding the new robot control program module received by the receiver means to the robot;
   selector means for selecting a robot control program module to be executed from a robot control program module originally included in the robot and the new robot control program module added to the robot; and
   control program executor means for executing the robot control program module selected by the selector means.

2. The robot, in accordance with claim 1, further comprising an initialization program executor means for executing an initialization program included in the new robot control program module registered by the register means, at the registration of the new robot control program module,
   the initialization program determining an execution point of time of the new robot control program module.

3. The robot in accordance with claim 1, further comprising an initialization program executor means for executing an initialization program included in the new robot control program module registered by the register means, at the registration of the new robot control program module; and
   a voice recognition word adder means for adding voice recognition words to a voice recognizer dictionary,
   the initialization program determining an execution point of time of the new robot control program module; and
   the voice recognition words being used to call the new robot control program module registered by the register means.

4. The robot in accordance with claim 1, further comprising
   a voice recognition word adder means for adding voice recognition words to a voice recognizer dictionary,
   the voice recognition words being used to call the new robot control program module registered by the register means.

5. The robot in accordance with claim 1, further comprising a received program executor means for executing the new robot control program module received by the receiver means, at the reception thereof.

6. The robot in accordance with claim 1, further comprising a received program executor means for executing the new robot control program module received by the receiver means, at the reception thereof; the received program executor means erases, after having executed the new robot control program module, the new robot control program module.

7. A robot, comprising:
a receiver means for receiving a new robot control program module from a communication line;
a register means for adding the new robot control program module received by the receiver means to the robot;
a selector means for selecting a robot control program module to be executed from a robot control program module originally included in the robot and the new robot control program module added to the robot; and
a control program executor means for executing the robot control program module selected by the selector means; and the receiver means uses an internet as the communication line and receives the new robot control program module by the internet.

8. The robot, in accordance with claim 7, further comprising an initialization program executor means for executing an initialization program included in the new robot control program module registered by the register means, at the registration of the control program module,
the initialization program determining an execution point of time of the new robot control program module.

9. The robot in accordance with claim 7, further comprising an initialization program executor means for executing an initialization program included in the new robot control program module registered by the register means, at the registration of the new robot control program module; and
a voice recognition word adder means for adding voice recognition words to a voice recognizer dictionary,
the initialization program determining an execution point of time of the new robot control program module; and
the voice recognition words being used to call the new robot control program module registered by the register means.

10. The robot in accordance with claim 7, further comprising
a voice recognition word adder means for adding voice recognition words to a voice recognizer dictionary,
the voice recognition words being used to call the new robot control program module registered by the register means.

11. The robot in accordance with claim 7, further comprising a received program executor means for executing the new robot control program module received by the receiver means, at the reception thereof.

12. The robot in accordance with claim 7, further comprising a received program executor means for executing the new robot control program module received by the receiver means, at the reception thereof; the received program executor means erases, after having executed the new robot control program module, the new robot control program module.

13. A robot control system, comprising:
receiver means for receiving a new robot control program module from a communication line;
register means for adding the new robot control program module received by the receiver means to the robot control system;
selector means for selecting a robot control program module to be executed from a robot control program module originally included in the robot control system and the new robot control program module added to the robot control system; and
control program executor means for executing the robot control program module selected by the selector means.

14. The robot control system, in accordance with claim 13, further comprising
an initialization program executor means for executing an initialization program included in the new robot control program module registered by the register means, at the registration of the new robot control program module,
the initialization program determining an execution point of time of the new robot control program module.

15. The robot control system in accordance with claim 13, further comprising
an initialization program executor means for executing an initialization program included in the new robot control program module registered by the register means, at the registration of the new robot control program module; and
a voice recognition word adder means for adding voice recognition words to a voice recognizer dictionary,
the initialization program determining an execution point of time of the new robot control program module; and
the voice recognition words being used to call the new robot control program module registered by the register means.

16. The robot control system in accordance with claim 13, further comprising
a voice recognition word adder means for adding voice recognition words to a voice recognizer dictionary,
the voice recognition words being used to call the new robot control program module registered by the register means.

17. The robot control system in accordance with claim 13, further comprising a received program executor means for executing the new robot control program module received by the receiver means, at the reception thereof.

18. The robot control system in accordance with claim 13, further comprising a received program executor means for executing the new robot control program module received by the receiver means, at the reception thereof;
the received program executor means erases, after having executed the new robot control program module, the new robot control program module.

19. A robot control system, comprising:
a receiver means for receiving a new robot control program module from a communication line;
a register means for adding the new robot control program module received by the receiver means to the robot control system;
a selector means for selecting a robot control program module to be executed from a robot control program module originally included in the robot control system and the new robot control program module added to the robot control system; and
a control program executor means for executing the robot control program module selected by the selector means; and
the receiver means uses an internet as the communication line and receives the new robot control program module by the internet.

20. The robot control system, in accordance with claim 19, further comprising
an initialization program executor means for executing an initialization program included in the new robot control program module registered by the register means, at the registration of the new robot control program module; and
the initialization program determining an execution point of time of the new robot control program module.

21. The robot control system in accordance with claim 19, further comprising
- an initialization program executor means for executing an initialization program included in the new robot control program module registered by the register means, at the registration of the new robot control program module; and
- a voice recognition word adder means for adding voice recognition words to a voice recognizer dictionary,
- the initialization program determining an execution point of time of the new robot control program module; and
- the voice recognition words being used to call the new robot control program module registered by the register means.

22. The robot control system in accordance with claim 19, further comprising
- a voice recognition word adder means for adding voice recognition words to a voice recognizer dictionary,
- the voice recognition words being used to call the new robot control program module registered by the register means.

23. The robot control system in accordance with claim 19, further comprising
- a received program executor means for executing the new robot control program module received by the receiver means, at the reception thereof.

24. The robot control system in accordance with claim 19, further comprising
- a received program executor means for executing the new robot control program module received by the receiver means, at the reception thereof;
- the received program executor means erases, after having executed the new robot control program module, the new robot control program module.

25. A program storage medium storing a program which, when executed on a computer controlling a robot, causes said computer to perform the steps of:
- receiving a new robot control program module from a communication line;
- registering the received new robot control program module in the robot;
- selecting a robot control program module to be executed from a robot control program module originally included in the robot and the new robot control program module received by the robot; and
- executing the selecting robot control program module.

26. A program storage medium storing a program in accordance with claim 25, wherein the receiving step uses an internet as the communication line and receives the new robot control program module by electronic mail.

27. The program storage medium storing a program in accordance with claim 25, further comprising the steps of making the computer execute an initialization program execution step,
- the initialization program execution step executing an initialization program included in the new robot control program module when the new robot control program module is registered in the robot.

28. The program storage medium storing a program in accordance with claim 25, further comprising the steps of making the computer execute an initialization program execution step and a voice recognition word adder step,
- the initialization program execution step executing an initialization program included in the new robot control program module when the new robot control program module is registered in the robot;
- the voice recognition word adder step adding voice recognition words to a voice recognizer dictionary;
- the voice recognition words being used to call the new robot control program module registered by the registering step.

29. The program storage medium storing a program in accordance with claim 25, further comprising the steps of making the computer execute a voice recognition word adder step,
- the voice recognition word adder step adding voice recognition words to a voice recognizer dictionary,
- the voice recognition words being used to call the new robot control program module registered by the registering step.

30. The program storage medium storing a program in accordance with claim 25, further comprising the step of making the computer execute a received program executing step of executing the new robot control program module at the reception thereof in the receiving step.

31. The program storage medium storing a program in accordance with claim 25, further comprising the steps of
- executing the new robot control program module at the reception thereof in the receiving step; and
- erasing the new robot control program module after having executed the new robot control program module.

32. A program storage medium storing a program which, when executed on a computer controlling a robot, causes said computer to perform the steps of:
- receiving a new robot control program module from a communication line;
- registering the received new robot control program module in the robot;
- selecting a robot control program module to be executed from a robot control program module originally included in the robot and the new robot control program module received by the robot; and
- executing the selected robot control program module; and
- wherein the receiving step includes using an internet as the communication line.

33. The program storage medium storing a program in accordance with claim 32, further comprising the steps of making the computer execute an initialization program execution step,
- the initialization program execution step executing an initialization program included in the new robot control program module when the new robot control program module is registered in the robot
- the initialization program determining an execution point of time of the new robot control program module.

34. The program storage medium storing a program in accordance with claim 32, further comprising the steps of making the computer execute an initialization program execution step and a voice recognition word adder step,
- the initialization program execution step executing an initialization program included in the new robot control program module when the new robot control program module is registered in the robot;
- the voice recognition word adder step adding voice recognition words to a voice recognizer dictionary;
- the voice recognition words being used to call the new robot control program module registered by the registering step.

35. The program storage medium storing a program in accordance with claim 32, further comprising the step of making the computer execute a received program executing step of executing the new robot control program module at the reception thereof in said receiving step.

36. The program storage medium storing a program in accordance with claim 32, further comprising the step of making the computer execute a received program executing step of executing the new robot control program module at the reception thereof in said receiving step wherein;

the received program executing step includes erasing, after having executed the new robot control program module.

37. A robot, comprising:

a receiver for receiving a new robot control program module from a communication line;

a register for adding the new robot control program module received by the receiver to the robot;

a selector for selecting a robot control program module to be executed from a robot control program module originally included in the robot and the new robot control program module added to the robot; and a control program executor for executing the robot control program module selected by the selector.

38. The robot, in accordance with claim 37, further comprising an initialization program executor for executing an initialization program included in the new robot control program module registered by the register, at the registration of the new robot control program module, the initialization program determining an execution point of time of the new robot control program module.

39. The robot in accordance with claim 37, further comprising an initialization program executor for executing an initialization program included in the new robot control program module registered by the register, at the registration of the new robot control program module; and a voice recognition word adder for adding voice recognition words to a voice recognizer dictionary, the initialization program determining an execution point of time of the new robot control program module; and the voice recognition words being used to call the new robot control program module registered by the register.

40. The robot in accordance with claim 37, further comprising a voice recognition word adder for adding voice recognition words to a voice recognizer dictionary, the voice recognition words being used to call the new robot control program module registered by the register.

41. The robot in accordance with claim 37, further comprising a received program executor for executing the new robot control program module received by the receiver, at the reception thereof.

42. The robot in accordance with claim 37, further comprising a received program executor for executing the new robot control program module received by the receiver, at the reception thereof; the received program executor erases, after having executed the new robot control program module, the new robot control program module.

* * * * *